US012211408B2

(12) United States Patent
Sung et al.

(10) Patent No.: US 12,211,408 B2
(45) Date of Patent: Jan. 28, 2025

(54) APPARATUS FOR EVALUATING LIFETIME OF DISPLAY PANEL AND METHOD FOR EVALUATING LIFETIME OF DISPLAY PANEL

(71) Applicant: Samsung Display Co., LTD., Yongin-si (KR)

(72) Inventors: Si Jin Sung, Yongin-si (KR); Sae Ron Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/385,064

(22) Filed: Oct. 30, 2023

(65) Prior Publication Data

US 2024/0203307 A1 Jun. 20, 2024

(30) Foreign Application Priority Data

Dec. 20, 2022 (KR) ........................ 10-2022-0179761

(51) Int. Cl.
*G09G 3/00* (2006.01)

(52) U.S. Cl.
CPC ....... *G09G 3/006* (2013.01); *G09G 2310/027* (2013.01); *G09G 2320/043* (2013.01); *G09G 2360/16* (2013.01)

(58) Field of Classification Search
CPC ................ G09G 3/006; G09G 3/3208; G09G 2300/0439; G09G 2310/027; G09G 2320/043; G09G 2360/16; G01M 11/00; G01M 11/02; G01M 11/0207; G01R 31/00; G01R 19/0092; G01R 19/2506; H10K 59/35
See application file for complete search history.

(56) References Cited

U.S. PATENT DOCUMENTS

| | | | | |
|---|---|---|---|---|
| 11,244,612 B2 * | 2/2022 | Ok | G09G 3/3233 |
| 2011/0169802 A1 * | 7/2011 | Yamashita | G09G 3/3291 345/211 |
| 2016/0086548 A1 * | 3/2016 | Maeyama | G09G 3/3233 345/82 |
| 2019/0213956 A1 * | 7/2019 | Park | G09G 3/3283 |
| 2022/0013049 A1 * | 1/2022 | Pyun | G09G 3/3233 |
| 2022/0230589 A1 * | 7/2022 | Xu | G09G 3/3258 |

FOREIGN PATENT DOCUMENTS

KR 102410761 B1 6/2022

* cited by examiner

*Primary Examiner* — David Tung
(74) *Attorney, Agent, or Firm* — CANTOR COLBURN LLP

(57) ABSTRACT

An apparatus for evaluating a lifetime of a display panel including first pixels disposed in a first display area and second pixels disposed in a second display area, includes: a controller for driving the first pixels with a first grayscale and the second pixels with a second grayscale during an aging period calculating a first current, a second current, and a third current, which are supplied to the display panel; a luminance calculator for calculating a first luminance of the first display area and calculating a second luminance of the second display area; and a corrector for calculating a first correction current and a second correction current. The controller calculates a first efficiency lifetime and a second efficiency lifetime, and evaluates the lifetime of the display panel based on the first efficiency lifetime and the second efficiency lifetime.

20 Claims, 16 Drawing Sheets

APPARATUS FOR EVALUATING LIFETIME OF DISPLAY PANEL AND METHOD FOR EVALUATING LIFETIME OF DISPLAY PANEL

The present application claims priority to Korean patent application No. 10-2022-0179761 filed on Dec. 20, 2022, and all the benefits accruing therefrom under 35 U.S.C. § 119, the content of which in its entirety is herein incorporated by reference.

BACKGROUND

1. Technical Field

The present invention relates to an apparatus for evaluating a lifetime of a display panel and a method for evaluating a lifetime of a display panel.

2. Related Art

A display panel is a device for visually displaying data. The display panel may be used as a display of small-sized products such as mobile phones, and be used as a display of large-sized products such as televisions.

The display panel includes a plurality of pixels which receive an electrical signal to emit light so as to display an image to the outside. Each pixel includes a light emitting element. For example, an organic light emitting display panel includes an organic light emitting diode as the light emitting element. Generally, in the organic light emitting display panel, a thin film transistor and an organic light emitting diode are formed on a substrate, and the organic light emitting diode autonomously emits light.

However, the organic light emitting diode is degraded as the use of the organic light emitting diode increases. Therefore, a characteristic of the organic light emitting diode may be changed. For example, as time elapses, the light emission efficiency of the organic light emitting diode is deteriorated, and therefore, a luminance characteristic may be deteriorated. Accordingly, research for predicting a lifetime of the organic light emitting display panel according to a degradation degree of the organic light emitting diode has been variously attempted.

SUMMARY

Embodiments provide an apparatus for evaluating a lifetime of a display panel and a method for evaluating a lifetime of a display panel, which can have a small current noise and efficiently and accurately evaluate a lifetime of the display panel.

In accordance with an aspect of the present invention, there is provided an apparatus for evaluating a lifetime of a display panel including first pixels disposed in a first display area and second pixels disposed in a second display area, the apparatus including: a controller configured to drive the first pixels with a first grayscale and the second pixels with a second grayscale during an aging period, calculate a first current supplied to the display panel in each of period in which the first pixels are driven with a third grayscale and the second pixels are driven with the second grayscale, calculate a second current supplied to the display panel in each of periods in which the first pixels and the second pixels are driven with the second grayscale, and calculate a third current supplied to the display panel in each of periods in which the first pixels are driven with the second grayscale and the second pixels are driven with a fourth grayscale; a luminance calculator configured to calculate a first luminance of the first display area in each of the periods in which the first pixels are driven with the third grayscale and the second pixels are driven with the second grayscale, and calculate a second luminance of the second display area in each of the periods in which the first pixels are driven with the second grayscale and the second pixels are driven with the fourth grayscale; and a corrector configured to calculate a first correction current, based on the calculated first current and the calculated second current, and calculate a second correction current, based on the calculated third current and the calculated second current, where the controller calculates a first efficiency lifetime, based on the calculated first correction current and the calculated first luminance, calculates a second efficiency lifetime, based on the calculated second correction current and the calculated second luminance, and evaluates the lifetime of the display panel, based on the first efficiency lifetime and the second efficiency lifetime.

The first display area and the second display area may be bilaterally symmetrical to each other.

The first grayscale may be a white grayscale, the second grayscale may be a black grayscale, the third grayscale may be the white grayscale, a red grayscale, a green grayscale, or a blue grayscale, and the fourth grayscale may be the white grayscale, the red grayscale, the green grayscale, or the blue grayscale.

The corrector may calculate the first correction current, based on a difference between the calculated first current and the calculated second current, and calculate the second correction current, based on a difference between the calculated third current and the calculated second current.

The controller may calculate the first efficiency lifetime, based on a ratio of the calculated first luminance with respect to the calculated first correction current, and calculate the second efficiency lifetime, based on a ratio of the calculated second luminance with respect to the calculated second correction current.

Each of the first pixels may include a first red sub-pixel, a first green sub-pixel, and a first blue sub-pixel, and each of the second pixels may include a second red sub-pixel, a second green sub-pixel, and a second blue sub-pixel.

Based on the first efficiency lifetime when the third grayscale is the white grayscale and the second efficiency lifetime when the fourth grayscale is the white grayscale, the controller may evaluate a white color lifetime of the display panel.

Based on the first efficiency lifetime when the third grayscale is the red grayscale and the second efficiency lifetime when the fourth grayscale is the red grayscale, the controller may evaluate a lifetime of the first red sub-pixels and the second red sub-pixels.

Based on the first efficiency lifetime when the third grayscale is the green grayscale and the second efficiency lifetime when the fourth grayscale is the green grayscale, the controller may evaluate a lifetime of the first green sub-pixels and the second green sub-pixels.

Based on the first efficiency lifetime when the third grayscale is the blue grayscale and the second efficiency lifetime when the fourth grayscale is the blue grayscale, the controller may evaluate a lifetime of the first blue sub-pixels and the second blue sub-pixels.

In accordance with an aspect of the present disclosure, there is provided a method for evaluating a lifetime of a display panel including first pixels disposed in a first display area and second pixels disposed in a second display area, the method including: driving the first pixels with a first grayscale and driving the second pixels with a second grayscale during an aging period; calculating a first current supplied to the display panel and a first luminance of the first display area in each of periods in which the first pixels are driven with a third grayscale and the second pixels are driven with the second grayscale; calculating a second current supplied to the display panel in each of periods in which the first pixels and the second pixels are driven with the second grayscale; calculating a third current supplied to the display panel and a second luminance of the second display area in each of periods in which the first pixels are driven with the second grayscale and the second pixels are driven with a fourth grayscale; calculating a first correction current, based on the calculated first current and the calculated second current, and calculating a second correction current, based on the calculated third current and the calculated second current; and calculating a first efficiency lifetime, based on the calculated first correction current and the calculated first luminance, and calculating a second efficiency lifetime, based on the calculated second correction current and the calculated second luminance.

The first display area and the second display area may be bilaterally symmetrical to each other.

The first grayscale may be a white grayscale, the second grayscale may be a black grayscale, the third grayscale may be the white grayscale, a red grayscale, a green grayscale, or a blue grayscale, and the fourth grayscale may be the white grayscale, the red grayscale, the green grayscale, or the blue grayscale.

The first correction current may be calculated based on a difference between the calculated first current and the calculated second current, and the second correction current may be calculated based on a difference between the calculated third current and the calculated second current.

The first efficiency lifetime may be calculated based on a ratio of the calculated first luminance with respect to the calculated first correction current, and the second efficiency lifetime may be calculated based on a ratio of the calculated second luminance with respect to the calculated second correction current.

Each of the first pixels may include a first red sub-pixel, a first green sub-pixel, and a first blue sub-pixel, and each of the second pixels may include a second red sub-pixel, a second green sub-pixel, and a second blue sub-pixel.

The method may further include evaluating a white color lifetime of the display panel, based on the first efficiency lifetime when the third grayscale is the white grayscale and the second efficiency lifetime when the fourth grayscale is the white grayscale.

The method may further include evaluating a lifetime of the first red sub-pixels and the second red sub-pixels, based on the first efficiency lifetime when the third grayscale is the red grayscale and the second efficiency lifetime when the fourth grayscale is the red grayscale.

The method may further include evaluating a lifetime of the first green sub-pixels and the second green sub-pixels based on the first efficiency lifetime when the third grayscale is the green grayscale and the second efficiency lifetime when the fourth grayscale is the green grayscale.

The method may further include evaluating a lifetime of the first blue sub-pixels and the second blue sub-pixels based on the first efficiency lifetime when the third grayscale is the blue grayscale and the second efficiency lifetime when the fourth grayscale is the blue grayscale.

BRIEF DESCRIPTION OF THE DRAWINGS

The above and other features of embodiments of the invention will become more apparent by describing in further detail embodiments thereof with reference to the accompanying drawings, in which.

DETAILED DESCRIPTION

Figure 1:
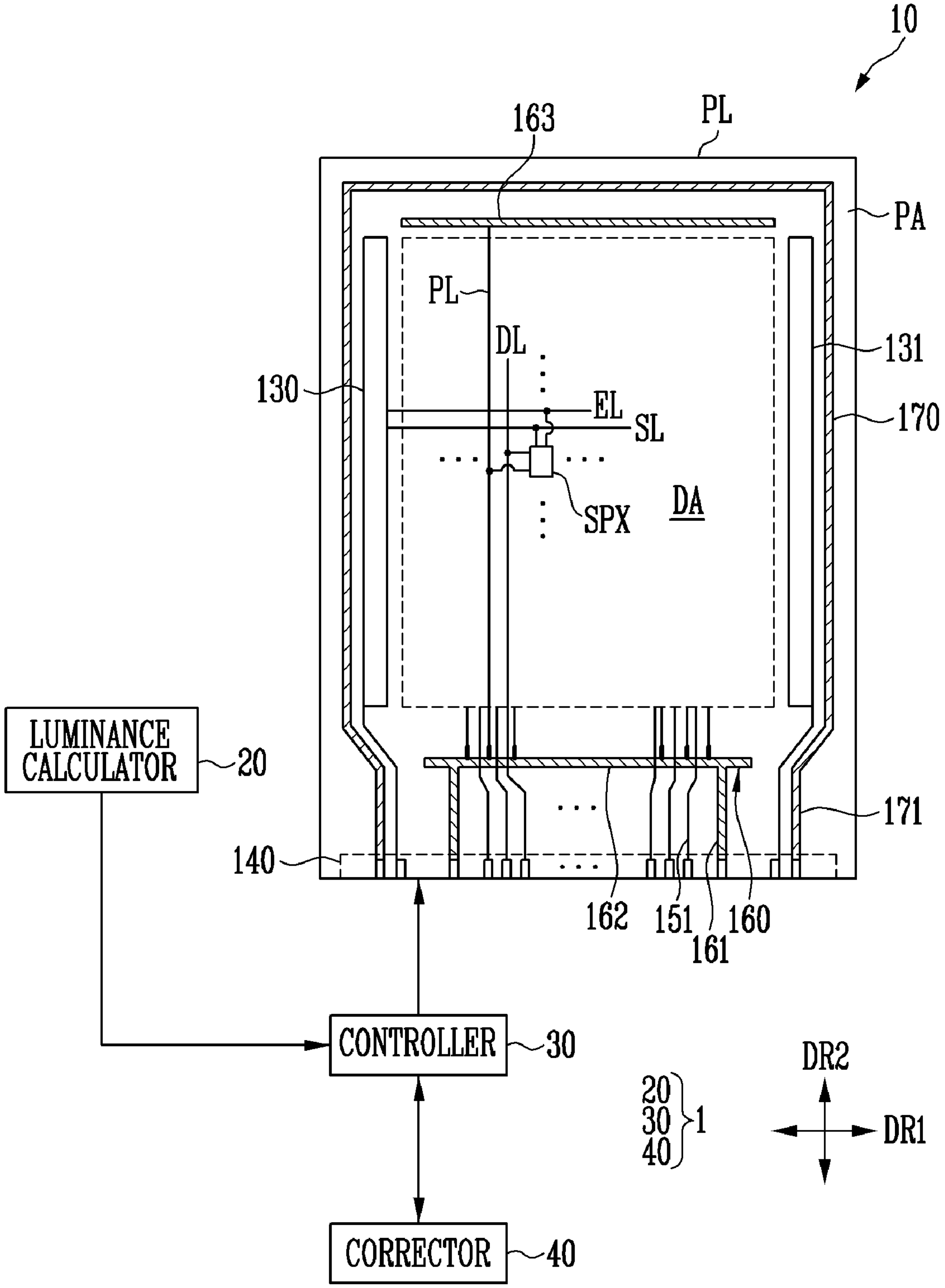
FIG. 1 is a diagram illustrating an apparatus for evaluating a lifetime of a display panel in accordance with an embodiment of the present disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In describing the drawings, like reference numerals have been used for like elements. In the accompanying drawings, the dimensions of the structures are enlarged than the actual size in order to clearly explain the invention. It will be understood that, although the terms “first”, “second”, etc. may be used herein to describe various elements, these elements should not be limited by these terms. These terms are only used to distinguish one element from another element. For instance, a first element discussed below could be termed a second element without departing from the scope of the invention. Similarly, the second element could also be termed the first element.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

In the following description, when a first part is "connected" to a second part, this includes not only the case where the first part is directly connected to the second part, but also the case where a third part is interposed therebetween and they are connected to each other.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present invention will be described in more detail with reference to the accompanying drawings.

FIG. 1 is a diagram illustrating an apparatus for evaluating a lifetime of a display panel in accordance with an embodiment of the present disclosure.

Referring to FIG. 1, the apparatus 1 may evaluate a lifetime of a display panel 10. The lifetime of the display panel 10 may mean a lifetime of a pixel (or a light emitting element) included in the display panel 10. The apparatus 1 may include a luminance calculator 20, a controller 30, and a corrector 40.

The display panel 10 may include a display area DA and a peripheral area PA surrounding at least a portion of the display area DA. The display area DA may be covered by an encapsulation member (not shown) to be protected from an external air, moisture, and the like.

A plurality of sub-pixels SPX, a plurality of scan lines SL, a plurality of emission control lines EL, a plurality of data lines DL, and a plurality of driving voltage lines PL may be disposed in the display area DA of the display panel 10.

Each of the sub-pixels SPX may include a light emitting element such as an organic light emitting diode ("OLED"). Each sub-pixel SPX may emit light of, for example, red, green or blue through the OLED. Sub-pixels SPX emitting lights of different colors as one group may constitute a pixel. The pixel including the sub-pixels SPX may emit light of red, green, blue or white. For example, one pixel may include two, three or four sub-pixels SPX.

Each of the scan lines SL may extend in a first direction (or row direction) DR1 to be connected to sub-pixels SPX located on the same row among the plurality of sub-pixels SPX. The scan lines SL may be arranged in a second direction (or column direction) DR2. Although the scan line SL is illustrated as one line in FIG. 1, the present disclosure is not limited thereto. For another example, the scan line SL may be configured with a plurality of lines.

Each of the emission control lines EL may extend in the first direction DR1 to be connected to sub-pixels SPX located on the same row among the plurality of sub-pixels SPX. The emission control lines EL may be arranged in the second direction DR2. Although the emission control line EL is illustrated as one line in FIG. 1, the present disclosure is not limited thereto. For another example, the emission control line EL may be configured with a plurality of lines.

Each of the data lines DL may extend in the second direction DR2 to be connected to sub-pixels SPX located on the same column among the plurality of sub-pixels SPX. The data lines DL may be arranged in the first direction DR1. The data lines DL may be connected to pads of a pad part 140, respectively, which will be described later through connection lines 151, and transfer a data signal (or data voltage) supplied from a data driver (not shown) to each sub-pixel SPX.

Each of the driving voltage lines PL may extend in the second direction DR2 to be connected to sub-pixels SPX located on the same column among the plurality of sub-pixels SPX. The driving voltage lines PL may be arranged in the first direction DR1.

The display panel 10 may include a scan driver 130, an emission control driver 131, a first power line 160, a second power line 170, and the pad part 140. Each sub-pixel SPX may be electrically connected to outer circuits disposed in the peripheral area PA.

The scan driver 130 may provide a scan signal to each sub-pixel SPX through the scan line SL. The emission control driver 131 may provide an emission control signal to each sub-pixel SPX through the emission control line EL.

The emission control driver 131 may be disposed in parallel to the scan driver 130 with the display area DA interposed therebetween. Some of the sub-pixels SPX disposed in the display area DA may be electrically connected to the scan driver 130, and the others of the sub-pixels SPX may be electrically connected to the emission control driver 131. In some embodiments, the emission control driver 131 may be omitted.

The first power line 160 may include a first sub-line 162 and a second sub-line 163, which extend in parallel to each other along the first direction DR1 with the display area DA interposed therebetween. The second power line 170 may partially surround the display area DA in a loop shape having one opened side. The arrangements and/or shapes of the first power line 160 and the second power line 170, which are shown in FIG. 1, are merely illustrative and may be variously modified.

The pad part 140 may be disposed at one side of the peripheral area PA. The pad part 140 is not covered by an insulating layer but may be exposed.

The luminance calculator 20 may calculate a luminance of at least a portion of the display area DA of the display panel 10. For example, the luminance calculator 20 may calculate a luminance of at least a portion of a first display area DA1 (see FIG. 2) of the display panel 10. The luminance calculator 20 may calculate a luminance of at least a portion of a second display area DA2 (see FIG. 2) of the display panel 10. The luminance calculator 20 may provide the calculated luminances to the controller 30.

The controller 30 may control the display panel 10. The controller 30 may include the above-described data driver. The controller 30 may control operation timings of the scan driver 130, the emission control driver 131, and the data driver, thereby controlling the display area DA. For example, a control signal generated by the controller 30 may be transferred to each of the scan driver 130, the emission control driver 131, and the data driver through the pad part 140. A first driving voltage ELVDD (see FIG. 3) generated by the controller 30 may be transferred to the first power line 160 through a first connection line 161 connected to a pad of the pad part 140. The first driving voltage ELVDD may be provided to each sub-pixel SPX through a driving voltage line PL connected to the first power line 160. A second driving voltage ELVSS (see FIG. 3) may be transferred to the second power line 170 through a second connection line 171 connected to a pad of the pad part 140. The second driving voltage ELVSS may be provided to a cathode of a light emitting element connected to the second power line 170.

The controller 30 may supply a current to the display panel 10. The display panel 10 may be operated using the current supplied from the controller 30. The controller 30 may calculate a current supplied to the display panel 10 in each of periods in which first pixel PX1 of the first display area DA1 of the display panel 10 and second pixels PX2 of the second display area DA2 of the display panel 10 are driven with specific grayscales, respectively. The controller 30 may provide the calculated current to the corrector 40. This will be described in detail later with reference to FIGS. 5A to 5D, 6, and 7A to 7D. As used herein, “calculate a current” means to calculate a value of the current, and “calculate luminance” means to calculate a value of the luminance.

The controller 30 may calculate an efficiency lifetime, based on a luminance calculated by the luminance calculator 20 and a correction current calculated by the corrector 40. The controller 30 may evaluate a lifetime of the display panel 10, based on the calculated efficiency lifetime. This will be described in detail later with reference to FIG. 8.

The corrector 40 may calculate a correction current, based on the current calculated by the controller 30. The calculated correction current may be provided to the controller 30. This will be described in detail later with reference to FIG. 8.

Figure 2:
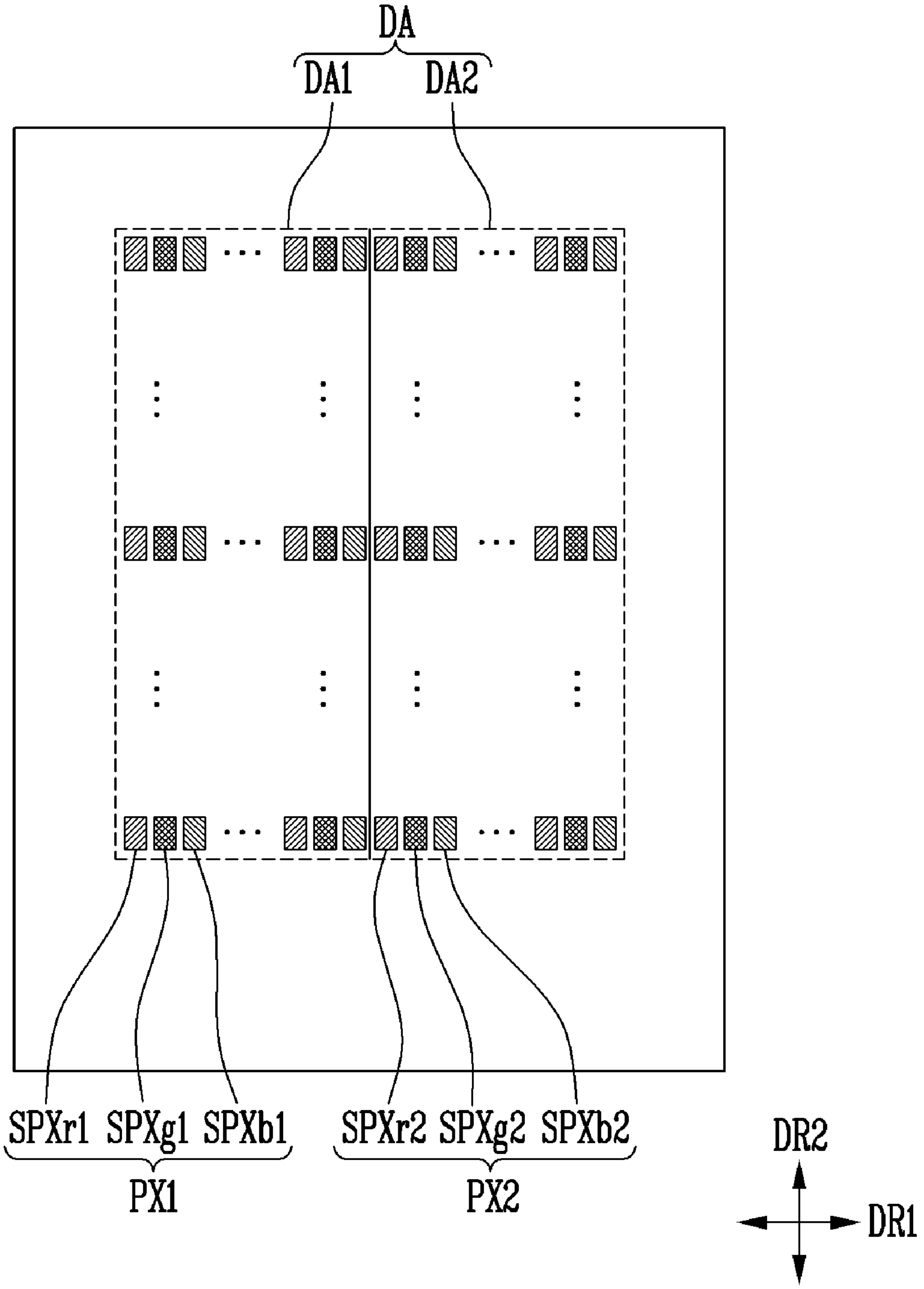
FIG. 2 is a diagram illustrating a display panel in accordance with an embodiment of the present invention.

FIG. 2 is a diagram illustrating a display panel in accordance with an embodiment of the present invention.

Referring to FIG. 2, a display area DA of the display panel 10 may include a first display area DA1 and a second display area DA2. The first display area DA1 and the second display area DA2 may be divided by a center line, extending along the second direction DR2, of the display panel 10. In an embodiment, the first display area DA1 and the second display area DA2 may substantially have the same area. That is, the first display area DA1 and the second display area DA2 may be bilaterally symmetrical to each other. However, the invention is not limited thereto. In another embodiment, the first display area DA1 and the second display area DA2 may be divided by a center line, extending along the first direction DR2, of the display panel 10. In still another embodiment, the display area DA may be divided into three or more display areas. Hereinafter, an embodiment including the first display area DA1 and the second display area DA2, which are divided by the center line, extending along the second direction DR2, of the display panel 10 will be explained as a representative example.

A plurality of pixels may be arranged along the first direction DR1 and the second direction DR2 in the display area DA. Pixels disposed in the first display area DA1 may be designated as first pixels PX1, and pixels disposed in the second display area DA2 may be designated as second pixels PX2. Each of the pixels may include a plurality of sub-pixels. For example, the first pixel PX1 may include a first red sub-pixel SPXr1, a first green sub-pixel SPXg1, and a first blue sub-pixel SPXb1, and the second pixel PX2 may include a second red sub-pixel SPXr2, a second green sub-pixel SPXg2, and a second blue sub-pixel SPXb2. The first red sub-pixel SPXr1 and the second red sub-pixel SPXr2 may emit light of red, the first green sub-pixel SPXg1 and the second green sub-pixel SPXr2 may emit light of green, and the first blue sub-pixel SPXb1 and the second blue sub-pixel SPXb2 may emit light of green.

Although a case where each of the pixels includes one red sub-pixel SPXr1, one green sub-pixel SPXg1, and one blue sub-pixel SPXb1 is illustrated in FIG. 2, the present invention is not limited thereto. For another example, each of the pixels may include one red sub-pixel SPXr1, two green sub-pixel SPXg1, and one blue sub-pixel SPXb1.

Although a case where the sub-pixels included in each of the pixels are disposed in a stripe structure is illustrated in FIG. 2, the present invention is not limited thereto. For another example, the sub-pixels of each of the pixels may be disposed in various forms including a PENTILE™ matrix structure (or PENTILE™ structure), a mosaic arrangement structure, a delta arrangement structure, and the like.

Figure 3:
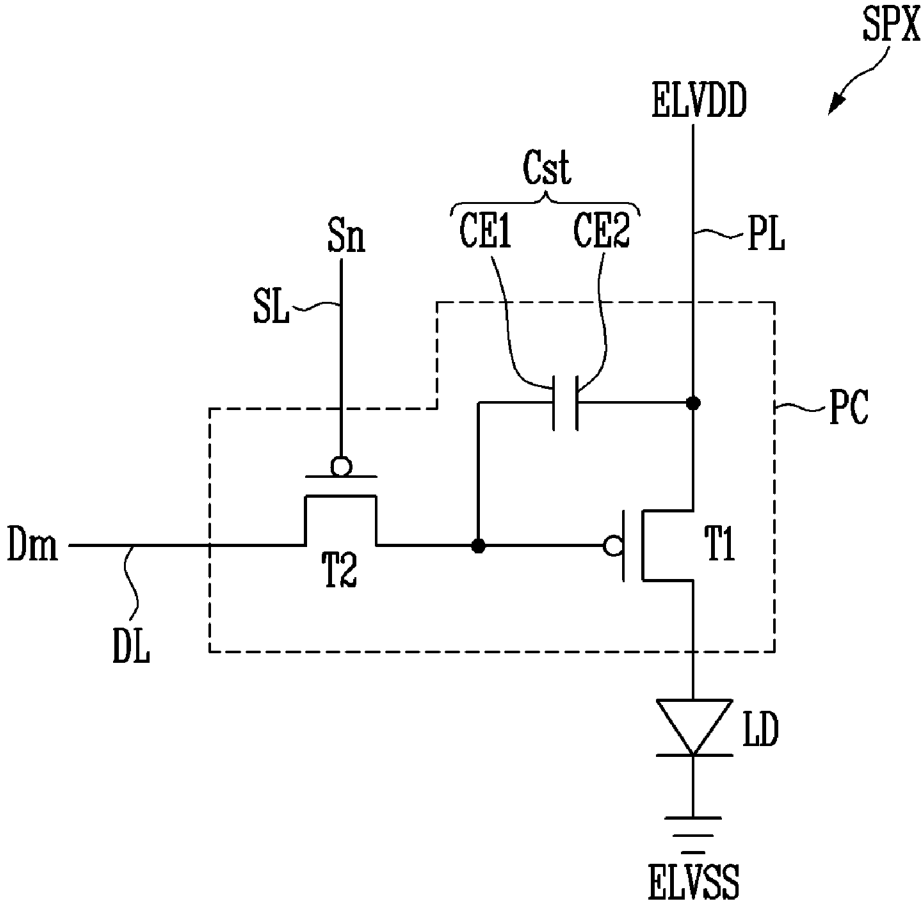
FIG. 3 is a diagram illustrating a sub-pixel in accordance with an embodiment of the present invention.

FIG. 3 is a diagram illustrating a sub-pixel in accordance with an embodiment of the present invention.

Referring to FIG. 3, the sub-pixel SPX may include a pixel circuit PC connected to a scan line SL and a data line DL, and a light emitting element LD connected to the pixel circuit PC. The light emitting element LD may be an organic light emitting diode (OLED) having an anode and a cathode. A cathode of the light emitting element LD may be a common electrode to which a second driving voltage ELVSS is applied. The cathode of the light emitting element LD may be connected to the second power line 170 (see FIG. 1).

The pixel circuit PC may include a first transistor T1, a second transistor T2, and a storage capacitor Cst.

The first transistor T1 may be a driving transistor in which a magnitude of a drain current is determined according to a gate-source voltage, and the second transistor T2 may be a switching transistor turned on/off according to a gate-source voltage, substantially, a gate voltage. Each of the first transistor T1 and the second transistor T2 may be formed as a thin film transistor.

The first transistor T1 may be designated as a driving transistor, and the second transistor T2 may be designated as a scan transistor.

The storage capacitor Cst may be connected between a driving voltage line PL connected to the first power line 160 (see FIG. 1) and a gate of the driving transistor T1. The storage capacitor Cst may have a second electrode CE2 connected to the driving voltage line PL and a first electrode CE1 connected to the gate of the driving transistor T1. The storage capacitor Cst may store a voltage corresponding to a difference between a voltage transferred from the scan transistor T2 and the first driving voltage ELVDD supplied to the driving power line PL.

The driving transistor T1 may control a magnitude of a driving current flowing from the driving voltage line PL to the light emitting element LD according to the gate-source voltage. The light emitting element LD may emit light having a predetermined luminance by means of the driving current. The driving transistor T1 may have the gate connected to the first electrode CE1 of the storage capacitor Cst, a source connected to the driving voltage line PL, and a drain connected to the light emitting element LD.

The scan transistor T2 may transfer a data voltage Dm to the gate of the driving transistor T1 in response to a scan signal Sn. The scan transistor T2 may have a gate connected to the scan line SL, a source connected to the data line DL, and a drain connected to the gate of the driving transistor T1.

Although a case where the pixel circuit PC includes two transistors and one storage capacitor has been described in FIG. 3, the present invention is not limited thereto. For another example, the pixel circuit PC may include at least three transistors and/or at least two storage capacitors, or include seven transistors and one storage capacitor.

Figure 4:
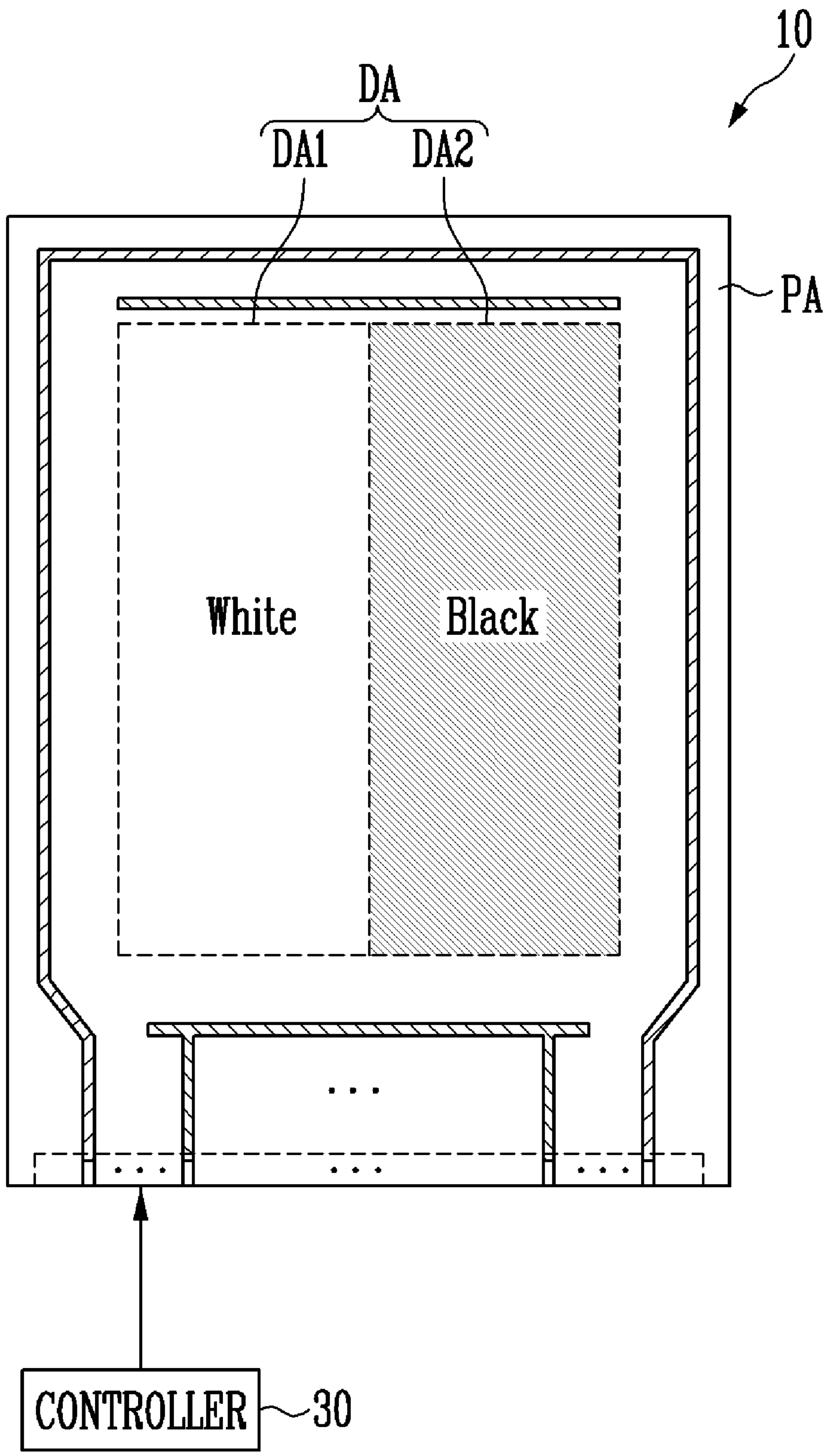
FIG. 4 is a diagram illustrating aging of the display panel in accordance with an embodiment of the present invention.

FIG. 4 is a diagram illustrating aging of the display panel in accordance with an embodiment of the present invention.

Referring to FIGS. 2 and 4, the controller 30 may perform aging on the display panel 10 by driving the first pixels PX1 of the first display area DA1 with a first grayscale and driving the second pixels PX2 of the second display area DA2 with a second grayscale during an aging period.

Here, the first grayscale may be a white grayscale, and the second grayscale may be a black grayscale. That the first grayscale in the first pixels PX1 is the white grayscale may mean that, for example, when image data is 8 bits, first red sub-pixels SPXr1 of the first pixels PX1 have grayscale 255, first green sub-pixels SPXg1 of the first pixels PX1 have the grayscale 255, and first blue sub-pixels SPXb1 of the first pixels PX1 have the grayscale 255. That the second grayscale in the second pixels PX2 is the black grayscale may mean that, for example, when image data is 8 bits, second red sub-pixels SPXr2 of the second pixels PX2 have grayscale 0, second green sub-pixels SPXg2 of the second pixels PX2 have the grayscale 0, and second blue sub-pixels SPXb2 of the second pixels PX2 have the grayscale 0.

FIGS. 5A to 5D are diagrams illustrating an operation of the apparatus in accordance with an embodiment of the present invention.

The controller 30 may calculate a first current supplied to the display panel 10 and provide data of the calculated first current to the corrector 40 in each of periods in which the first pixels PX1 of the first display area DA1 are driven with a third grayscale and the second pixels PX2 of the second display area DA2 are driven with the second grayscale. That is, the controller 30 may calculate a change in the first current supplied to the display panel 10 in each of the periods in which the first pixels PX1 of the first display area DA1 are driven with the third grayscale and the second pixels PX2 of the second display area DA2 are driven with the second grayscale.

The luminance calculator 20 may calculate a luminance of at least a portion of the first display area DA1 and provide the calculated luminance to the controller 30 in each of the periods in which the first pixels PX1 of the first display area DA1 are driven with the third grayscale and the second pixels PX2 of the second display area DA2 are driven with the second grayscale.

Figure 5A:
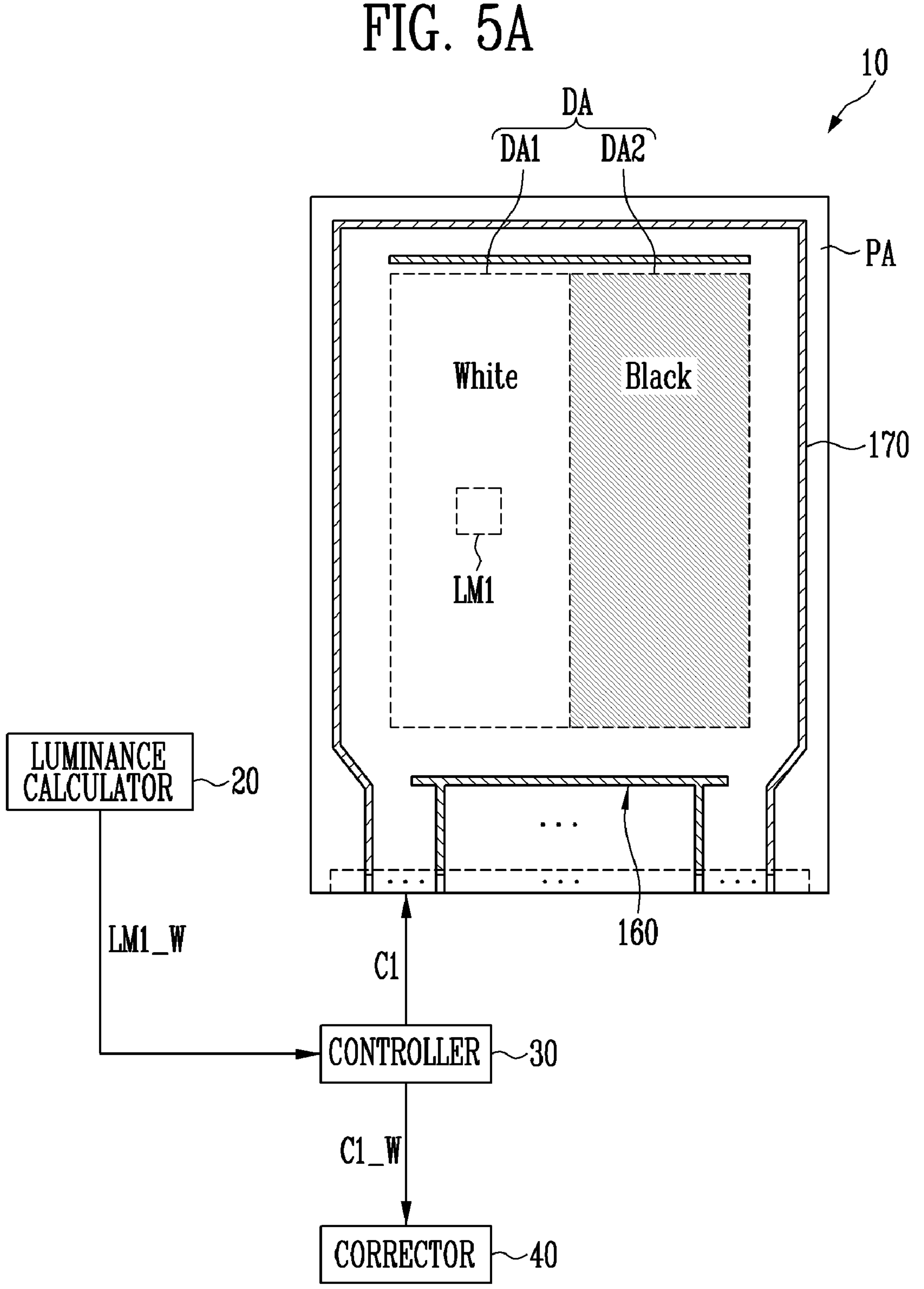
FIGS. 5A, 5B, 5C and 5D are diagrams illustrating an operation of the apparatus in accordance with an embodiment of the present invention.

Referring to FIGS. 2 and 5A, here, the third grayscale may be the white grayscale, and the second grayscale may be the black grayscale. That the third grayscale in the first pixels PX1 is the white grayscale may mean that, for example, when image data is 8 bits, the first red sub-pixels SPXr1 of the first pixels PX1 have the grayscale 255, the first green sub-pixels SPXg1 of the first pixels PX1 have the grayscale 255, and the first blue sub-pixels SPXb1 of the first pixels PX1 have the grayscale 255.

The controller 30 may calculate a first current C1 supplied to the display panel 10 and provide the calculated first current C1_W to the corrector 40 in each of periods in which the first pixels PX1 of the first display area DA1 are driven with the white grayscale and the second pixels PX2 of the second display area DA2 are driven with the black grayscale. The luminance calculator 20 may calculate a luminance LM1 of at least a portion of the first display area DA1 and provide the calculated luminance LM1_W to the controller 30 in each of the periods in which the first pixels PX1 of the first display area DA1 are driven with the white grayscale and the second pixels PX2 of the second display area DA2 are driven with the black grayscale.

Figure 5B:
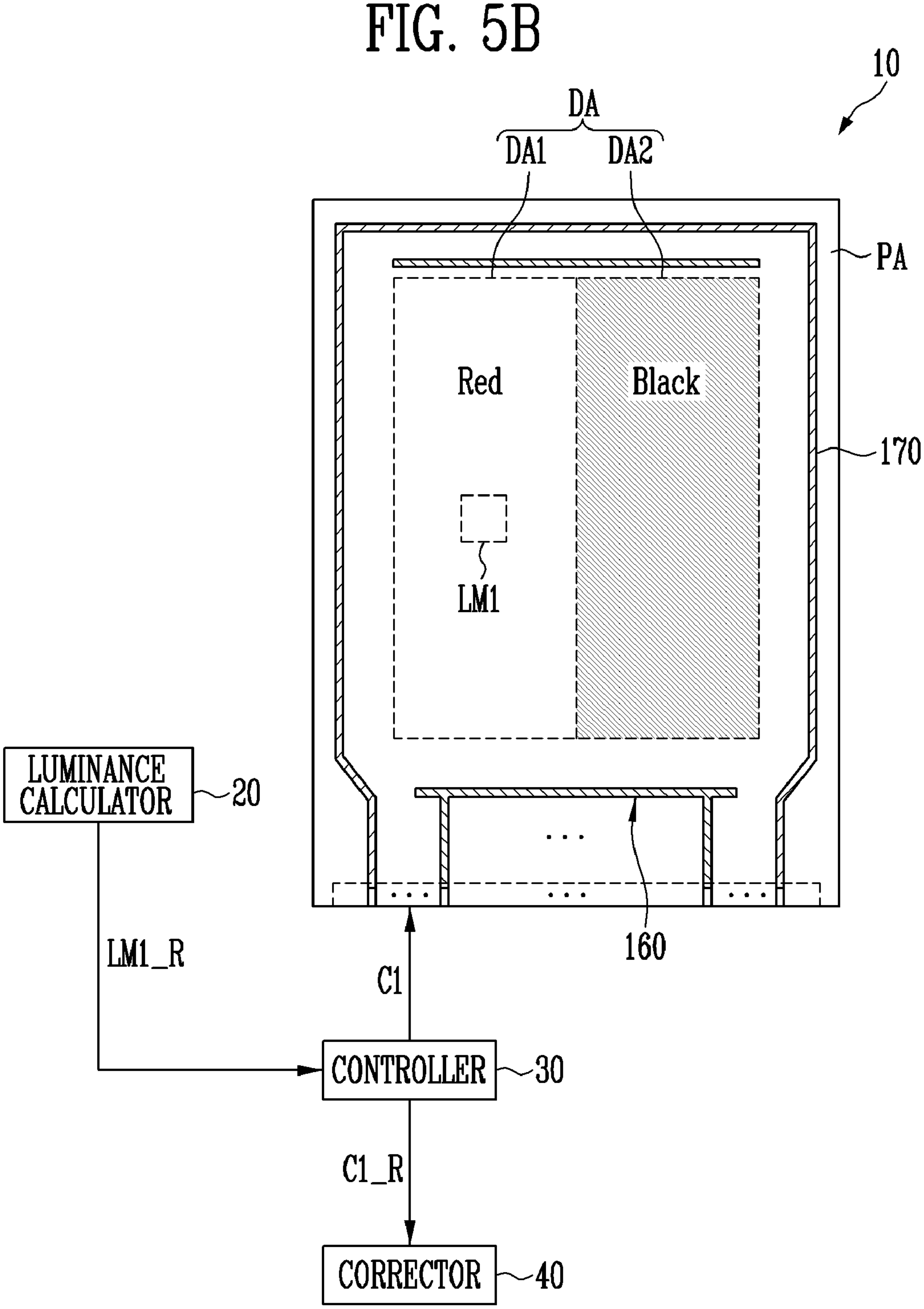

Referring to FIGS. 2 and 5B, here, the third grayscale may be a red grayscale and the second grayscale may be the black grayscale. That the third grayscale in the first pixels PX1 is the red grayscale may mean that, for example, when image data is 8 bits, the first red sub-pixels SPXr1 of the first pixels PX1 have the grayscale 255, the first green sub-pixels SPXg1 of the first pixels PX1 have the grayscale 0, and the first blue sub-pixels SPXb1 of the first pixels PX1 have the grayscale 0.

The controller 30 may calculate a first current C1 supplied to the display panel 10 and provide the calculated first current C1_R to the corrector 40 in each of periods in which the first pixels PX1 of the first display area DA1 are driven with the red grayscale and the second pixels PX2 of the second display area DA2 are driven with the black grayscale. The luminance calculator 20 may calculate a luminance LM1 of at least a portion of the first display area DA1 and provide the calculated luminance LM1_R to the controller 30 in each of the periods in which the first pixels PX1 of the first display area DA1 are driven with the red grayscale and the second pixels PX2 of the second display area DA2 are driven with the black grayscale.

Figure 5C:
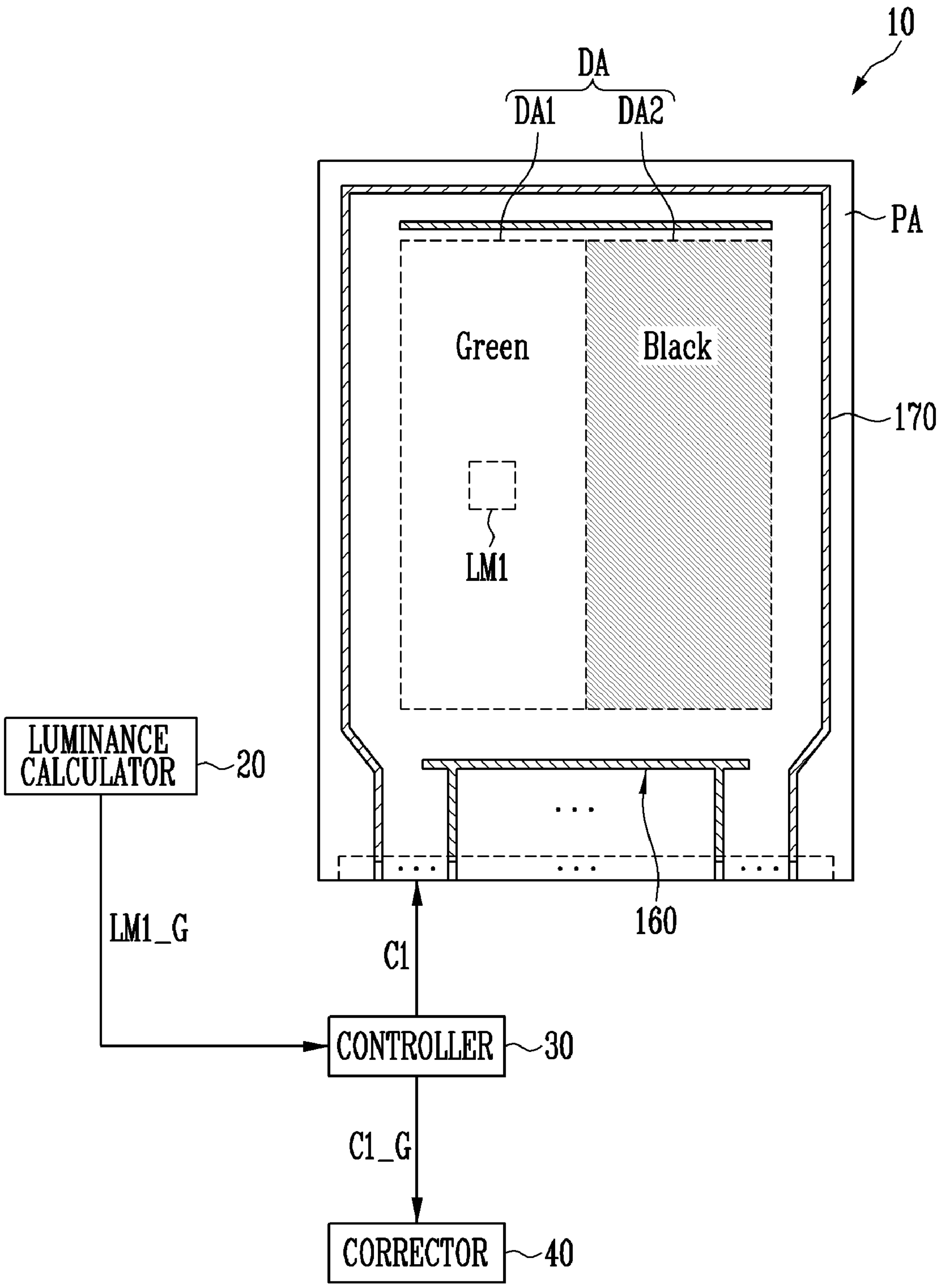

Referring to FIGS. 2 and 5C, here, the third grayscale may be a green grayscale, and the second grayscale may be the black grayscale. That the third grayscale in the first pixels PX1 is the green grayscale may mean that, for example, when image data is 8 bits, the first red sub-pixels SPXr1 of the first pixels PX1 have the grayscale 0, the first green sub-pixels SPXg1 of the first pixels PX1 have the grayscale 255, and the first blue sub-pixels SPXb1 of the first pixels PX1 have the grayscale 0.

The controller 30 may calculate a first current C1 supplied from the display panel 10 and provide the calculated first current C1_G to the corrector 40 in each of periods in which the first pixels PX1 of the first display area DA1 are driven with the green grayscale and the second pixels PX2 of the second display area DA2 are driven with the black grayscale. The luminance calculator 20 may calculate a luminance of at least a portion of the first display area DA1 and provide the calculated luminance LM1_G to the controller 30 in each of the periods in which the first pixels PX1 of the first display area DA1 are driven with the green grayscale and the second pixels PX2 of the second display area DA2 are driven with the black grayscale.

Figure 5D:
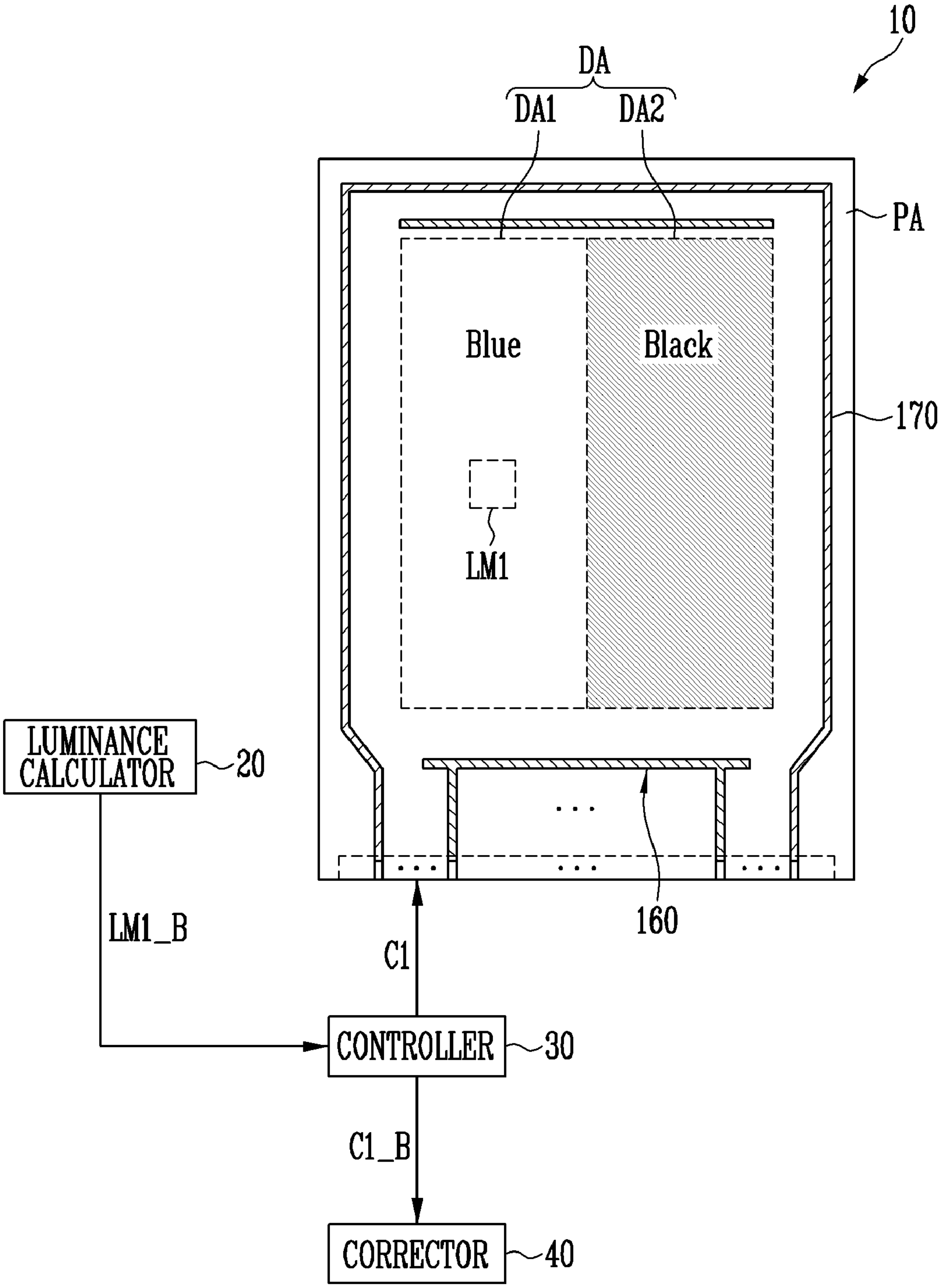

Referring to FIGS. 2 and 5D, here, the third grayscale may be a blue grayscale, and the second grayscale may be the black grayscale. That the third grayscale in the first pixels PX1 is the blue grayscale may mean that, for example, when image data is 8 bits, the first red sub-pixels SPXr1 of the first pixels PX1 have the grayscale 0, the first green sub-pixels SPXg1 of the first pixels PX1 have the grayscale 0, and the first blue sub-pixels SPXb1 of the first pixels PX1 have the grayscale 255.

The controller 30 may calculate a first current C1 supplied to the display panel 10 and provide the calculated first current C1_B to the corrector 40 in each of periods in which the first pixels PX1 of the first display area DA1 are driven with the blue grayscale and the second pixels PX2 of the second display area DA2 are driven with the black grayscale. The luminance calculator 20 may calculate a luminance LM1 of at least a portion of the first display area DA1 and provide the calculated luminance LM1_B to the controller 30 in each of the periods in which the first pixels PX1 of the first display area DA1 are driven with the blue grayscale and the second pixels PX2 of the second display area DA2 are driven with the black grayscale.

The lifetime of the display panel 10 may be evaluated using a method of measuring a driving current flowing through the light emitting element and a luminance of the display panel 10 (hereinafter, referred to as comparative example 1). The driving current may be a current flowing between the first power line 160 and the second power line 170. Since a change in the driving current flowing through the light emitting element means degradation of the light emitting element, the comparative example 1 can accurately evaluate the lifetime of the display panel 10. However, in order to measure the driving current flowing through the light emitting element, a current measuring device connected to the second power line 170 to which the second driving voltage ELVSS (see FIG. 3) is transferred is additionally required. Therefore, in the comparative example 1, it may be difficult to apply mass production due to the size, cost, and the like of the current measuring device. Also, in the comparative example 1, a current except the driving current, e.g., a leakage current or the like flows in the second power line 170, and therefore, a current noise may be large.

Accordingly, the lifetime of the display panel 10 may be evaluated using a method of measuring a current supplied to the display panel 10 and a luminance of the display panel 10 in an operation of the display panel 10 (hereinafter, referred to as comparative example 2). That is, in the comparative example 2, the lifetime of the display panel 10 may be evaluated by measuring a current supplied to the display panel 10 and a luminance of the display panel 10 in the apparatus. In the comparative example 2, since any separate current measuring device is not required, it is easy to apply mass production, and a current noise is small. However, in the comparative example 2, the current supplied to the display panel 10 may include a default current for an operation of the display panel 10 in addition to the driving current flowing through the light emitting element. The default current may include a current flowing through components of the display panel 10 except the light emitting element in an operation of the display panel 10, including a current flowing in the scan driver 130 (see FIG. 1), a current flowing in the emission control driver 131 (see FIG. 1), a current flowing in the pixel circuit PC (see FIG. 3) of the sub-pixel SPX, and the like. Since the default current may vary according to specifications of the display panel 10, the comparative example 2 may cause an error (or difference) in lifetime evaluation of the display panel 10.

Figure 6:
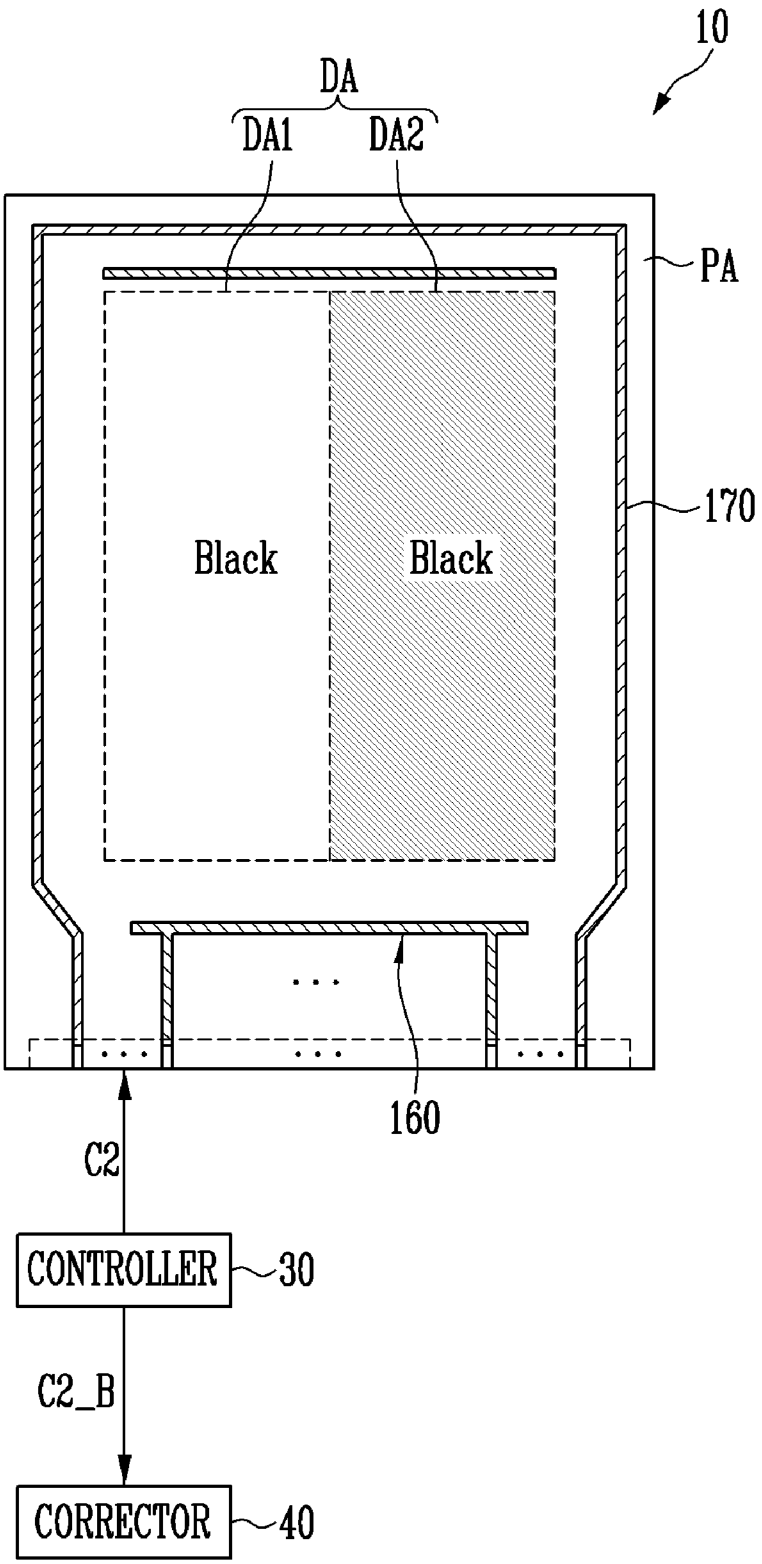
FIG. 6 is a diagram illustrating an operation of the apparatus in accordance with an embodiment of the present invention.

FIG. 6 is a diagram illustrating an operation of the apparatus in accordance with an embodiment of the present invention.

Referring to FIGS. 2 and 6, the controller 30 may calculate a second current C2 and provide the calculated second current C2_B to the corrector 40 in each of periods in which both the first pixels PX1 of the first display area DA1 and the second pixels PX2 of the second display area DA2 are driven with the second grayscale.

Here, the second grayscale my be the black grayscale. That the second grayscale in the first pixels PX1 is the black grayscale may mean that, for example, when image data is 8 bits, the first red sub-pixels SPXr1 of the first pixels PX1 have the grayscale 0, the first green sub-pixels SPXg1 of the first pixels PX1 have the grayscale 0, and the first blue sub-pixels SPXb1 of the first pixels PX1 have the grayscale 0. Also, that the second grayscale in the second pixels PX2 is the black grayscale may mean that, for example, when image data is 8 bits, second red sub-pixels SPXr2 of the second pixels PX2 have the grayscale 0, second green sub-pixels SPXg2 of the second pixels PX2 have the grayscale 0, and second blue sub-pixels SPXb2 of the second pixels PX2 have the grayscale 0.

The second current C2 may include only the default current. That is, the second current C2 may not include the driving current flowing through the light emitting element. As the first pixels PX1 of the first display area DA1 and the second pixels PX2 of the second display area DA2 are driven with the black grayscale (i.e., do not emit light), the driving current does not flow through light emitting elements included in the first pixels PX1 of the first display area DA1 and light emitting elements included in the second pixels PX2 of the second display area DA2, and therefore, the second current C2 may include only the default current.

That is, the controller 30 may calculate a change in the default current supplied to the display panel 10 in each of periods in which the first pixels PX1 of the first display area DA1 and the second pixels PX2 of the second display area DA2 are driven with the black grayscale.

FIGS. 7A to 7D are diagrams illustrating an operation of the apparatus in accordance with an embodiment of the present invention.

The controller 30 may calculate a third current supplied to the display panel 10 and provide the calculated third current to the corrector 40 in each of periods in which the first pixels PX1 of the first display area DA1 are driven with the second grayscale and the second pixels PX2 of the second display area DA2 are driven with a fourth grayscale. That is, the controller 30 may calculate a change in the third current C3 supplied to the display panel 10 in each of the periods in which the first pixels PX1 of the first display area DA1 are driven with the second grayscale and the second pixels PX2 of the second display area DA2 are driven with the fourth grayscale.

The luminance calculator 20 may calculate a luminance LM2 of at least a portion of the second display area DA2 and provide the calculated luminance to the controller 30 in each of the periods in which the first pixels PX1 of the first display area DA1 are driven with the second grayscale and the second pixels PX2 of the second display area DA2 are driven with the fourth grayscale.

Referring to FIGS. 2 to 7A, here, the second grayscale may be the black grayscale, and the fourth grayscale may be the white grayscale. That the second grayscale in the first pixels PX1 is the black grayscale may mean that, for example, when image data is 8 bits, the first red sub-pixels SPXr1 of the first pixels PX1 have the grayscale 0, the first green sub-pixels SPXg1 of the first pixels PX1 have the grayscale 0, and the first blue sub-pixels SPXb1 of the first pixels PX1 have the grayscale 0. That the fourth grayscale in the second pixels PX2 is the white grayscale may mean that, for example, when image data is 8 bits, the second red sub-pixels SPXr2 of the second pixels PX2 have the grayscale 255, the second green sub-pixels SPXg2 of the second pixels PX2 have the grayscale 255, and the second blue sub-pixels SPXb2 of the second pixels PX2 have the grayscale 255.

The controller 30 may calculate a third current C3 and provide the calculated third current C3_W to the corrector 40 in each of periods in which the first pixels PX1 of the first display area DA1 are driven with the black grayscale and the second pixels PX2 of the second display area DA2 are driven with the white grayscale. The luminance calculator 20 may calculate a luminance LM2 of at least a portion of the second display area DA2 and provide the calculated luminance LM2_W to the controller 30 in each of the periods in which the first pixels PX1 of the first display area DA1 are driven with the black grayscale and the second pixels PX2 of the second display area DA2 are driven with the white grayscale.

Figure 7A:
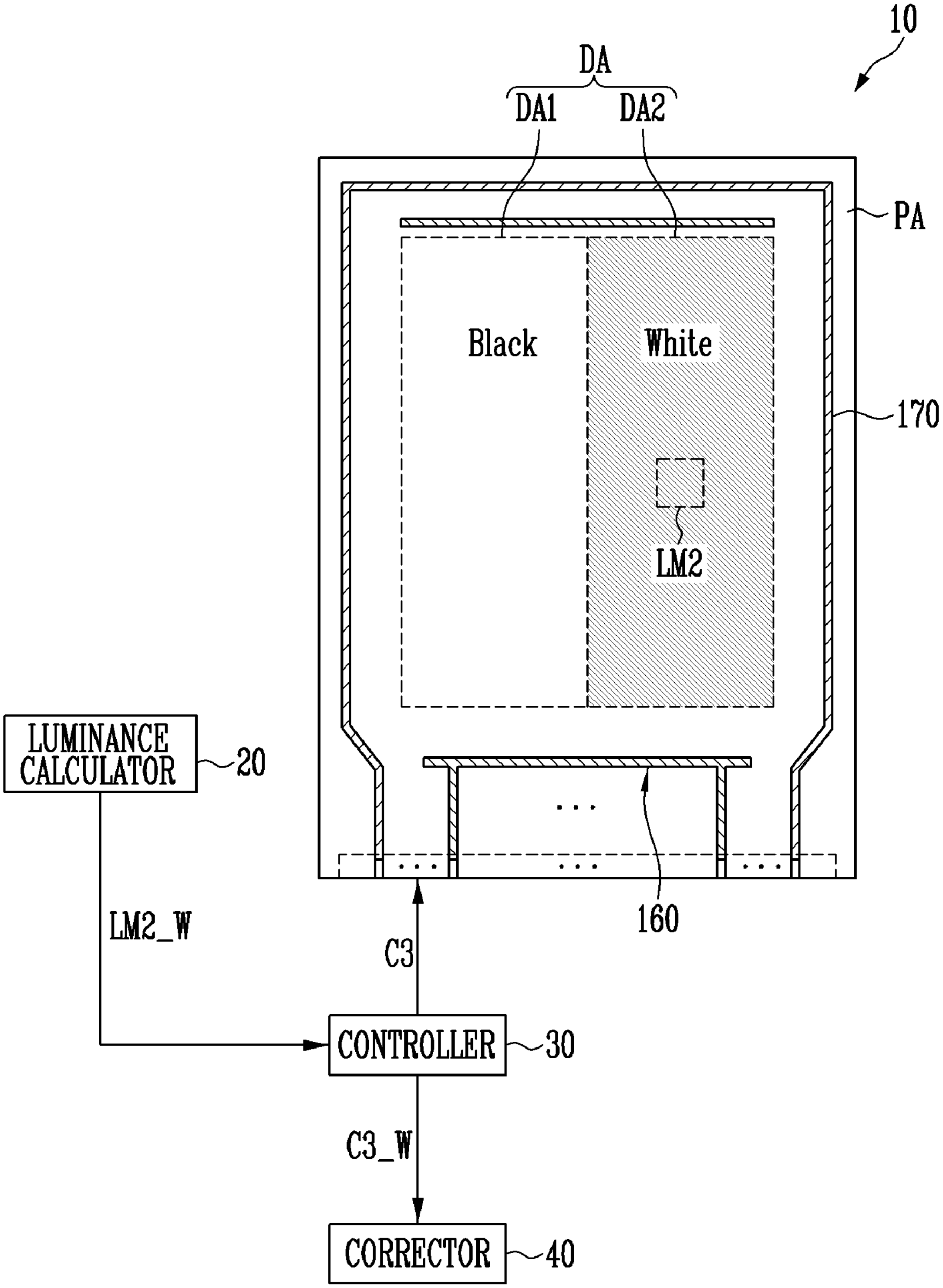
FIGS. 7A, 7B, 7C and 7D are diagrams illustrating an operation of the apparatus in accordance with an embodiment of the present invention.
Figure 7B:
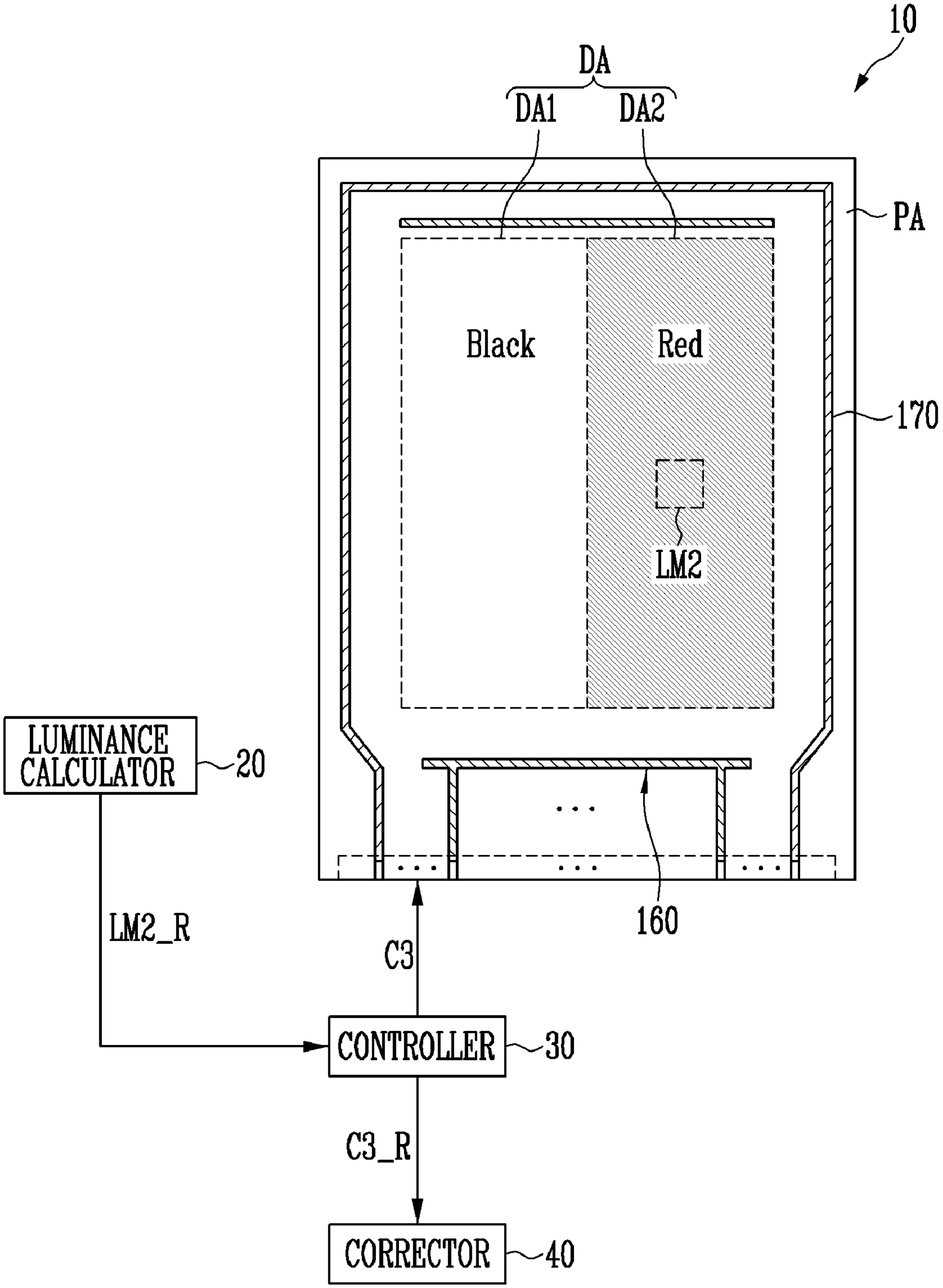

Referring to FIGS. 2 and 7B, here, the second grayscale may be the black grayscale, and the fourth grayscale may be a red grayscale. That the fourth grayscale in the second pixels PX2 is the red grayscale may mean that, for example, when image data is 8 bits, the second red sub-pixels SPXr2 of the second pixels PX2 have the grayscale 255, the second green sub-pixels SPXg2 of the second pixels PX2 have the grayscale 0, and the second blue sub-pixels SPXb2 of the second pixels PX2 have the grayscale 0.

The controller 30 may calculate a third current C3 supplied to the display panel 10 and provide the calculated third current C3_R to the corrector 40 in each of periods in which the first pixels PX1 of the first display area DA1 are driven with the black grayscale and the second pixels PX2 of the second display area DA2 are driven with the red grayscale. The luminance calculator 20 may calculate a luminance LM2 of at least a portion of the second display area DA2 and provide the calculated luminance LM2_R to the controller 30 in each of the periods in which the first pixels PX1 of the first display area DA1 are driven with the black grayscale and the second pixels PX2 of the second display area DA2 are driven with the red grayscale.

Figure 7C:
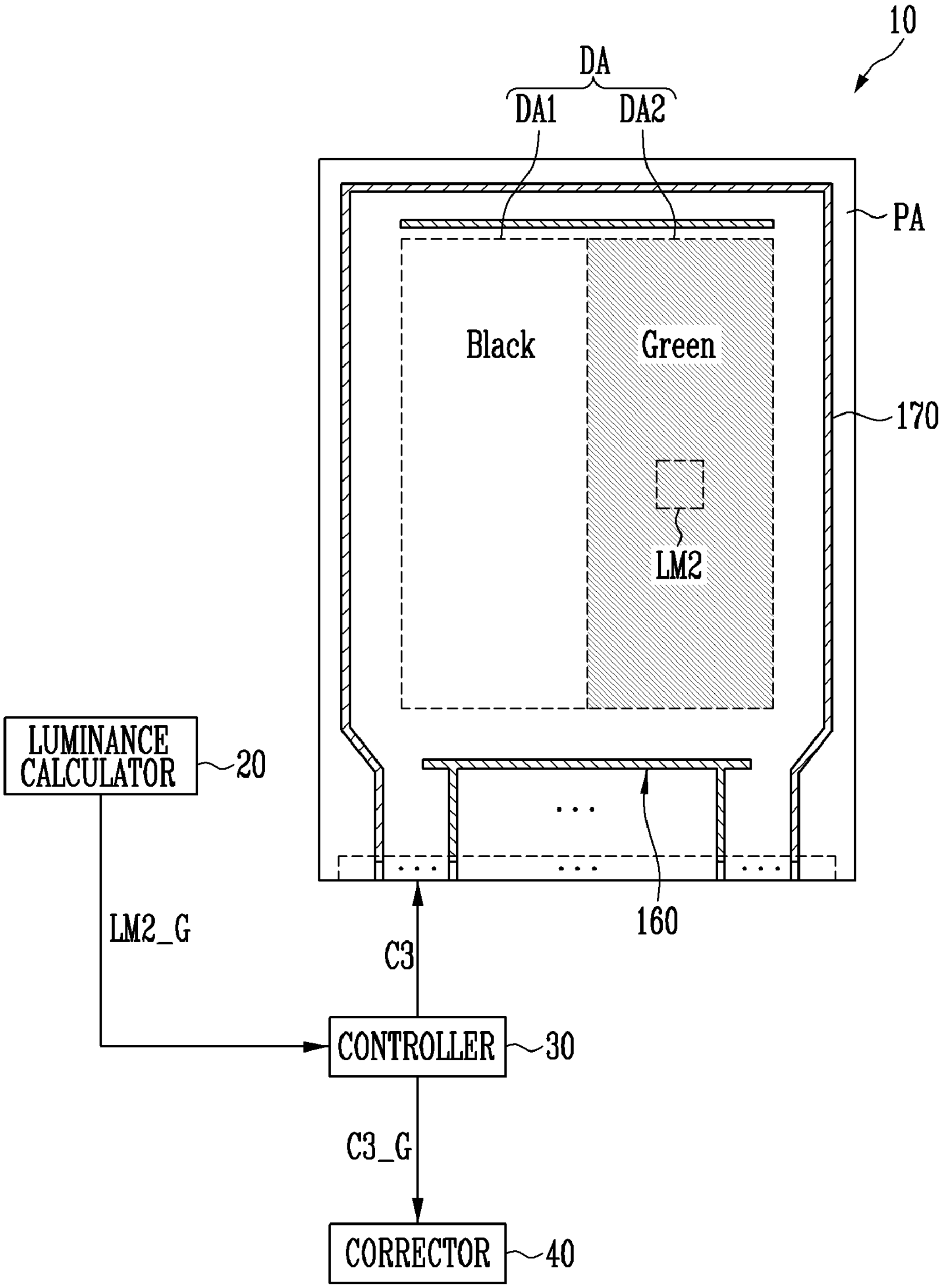

Referring to FIGS. 2 and 7C, here, the second grayscale may be the black grayscale, and the fourth grayscale may be a green grayscale. That the fourth grayscale in the second pixels PX2 is the green grayscale may mean that, for example, when image data is 8 bits, the second red sub-pixels SPXr2 of the second pixels PX2 have the grayscale 0, the second green sub-pixels SPXg2 of the second pixels PX2 have the grayscale 255, and the second blue sub-pixels SPXb2 of the second pixels PX2 have the grayscale 0.

The controller 30 may calculate a third current C3 supplied to the display panel 10 and provide the calculated third current C3_G to the corrector 40 in each of periods in which the first pixels PX1 of the first display area DA1 are driven with the black grayscale and the second pixels PX2 of the second display area DA2 are driven with the green grayscale. The luminance calculator 20 may calculate a luminance LM2 of at least a portion of the second display area DA2 and provide the calculated luminance LM2_G to the controller 30 in each of the periods in which the first pixels PX1 of the first display area DA1 are driven with the black grayscale and the second pixels PX2 of the second display area DA2 are driven with the green grayscale.

Figure 7D:
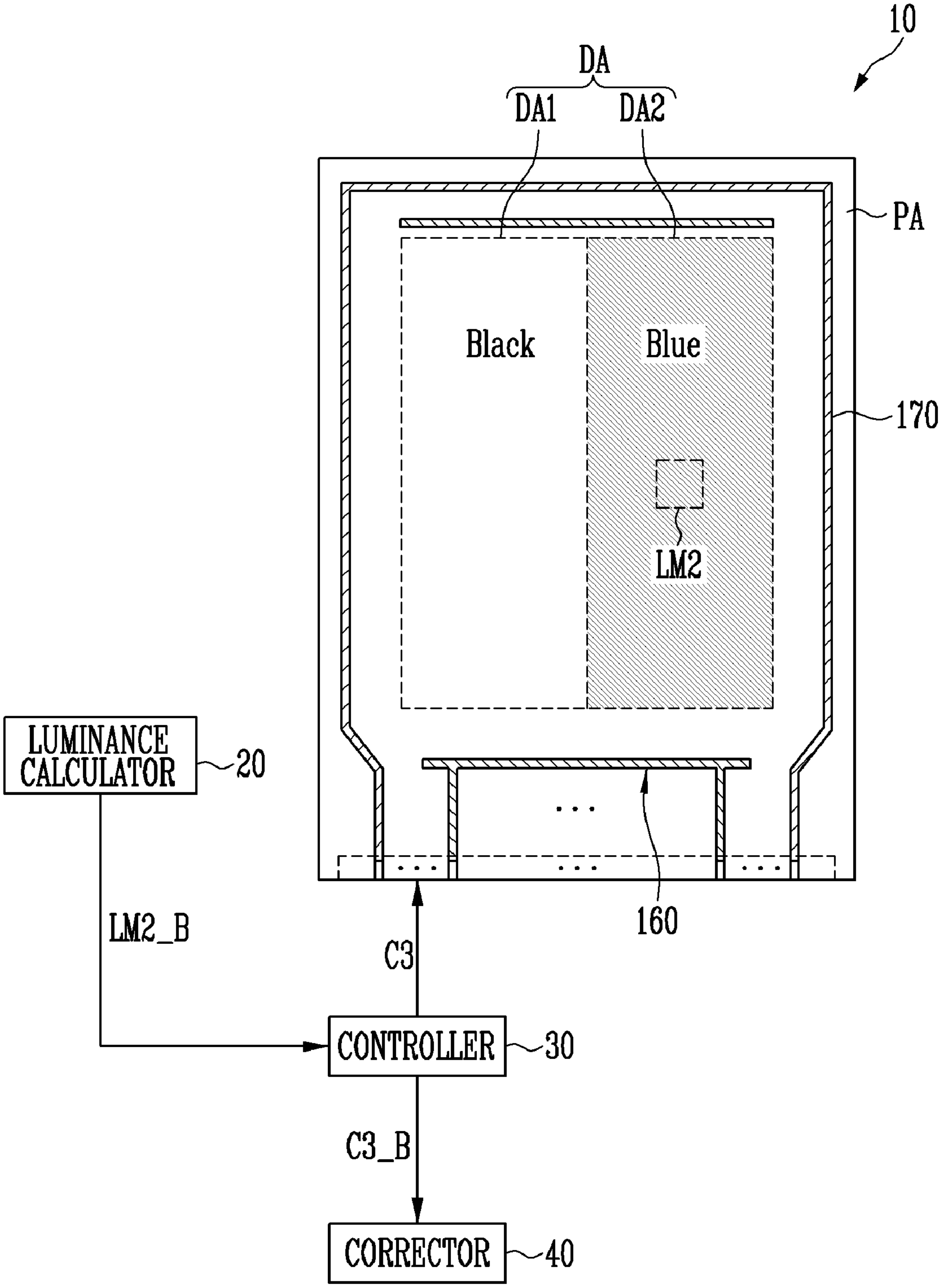

Referring to FIGS. 2 and 7D, here, the second grayscale may be the black grayscale, and the fourth grayscale may be a blue grayscale. That the fourth grayscale in the second pixels PX2 is the blue grayscale may mean that, for example, when image data is 8 bits, the second red sub-pixels SPXr2 of the second pixels PX2 have the grayscale 0, the second green sub-pixels SPXg2 of the second pixels PX2 have the grayscale 0, and the second blue sub-pixels SPXb2 of the second pixels PX2 have the grayscale 255.

The controller 30 may calculate a third current C3 supplied to the display panel 10 and provide the calculated third current C3_B to the corrector 40 in each of periods in which the first pixels PX1 of the first display area DA1 are driven with the black grayscale and the second pixels PX2 of the second display area DA2 are driven with the blue grayscale. The luminance calculator 20 may calculate a luminance LM2 of at least a portion of the second display area DA2 and provide the calculated luminance LM2_B to the controller 30 in each of the periods in which the first pixels PX1 of the first display area DA1 are driven with the black grayscale and the second pixels PX2 of the second display area DA2 are driven with the blue grayscale.

Figure 8:
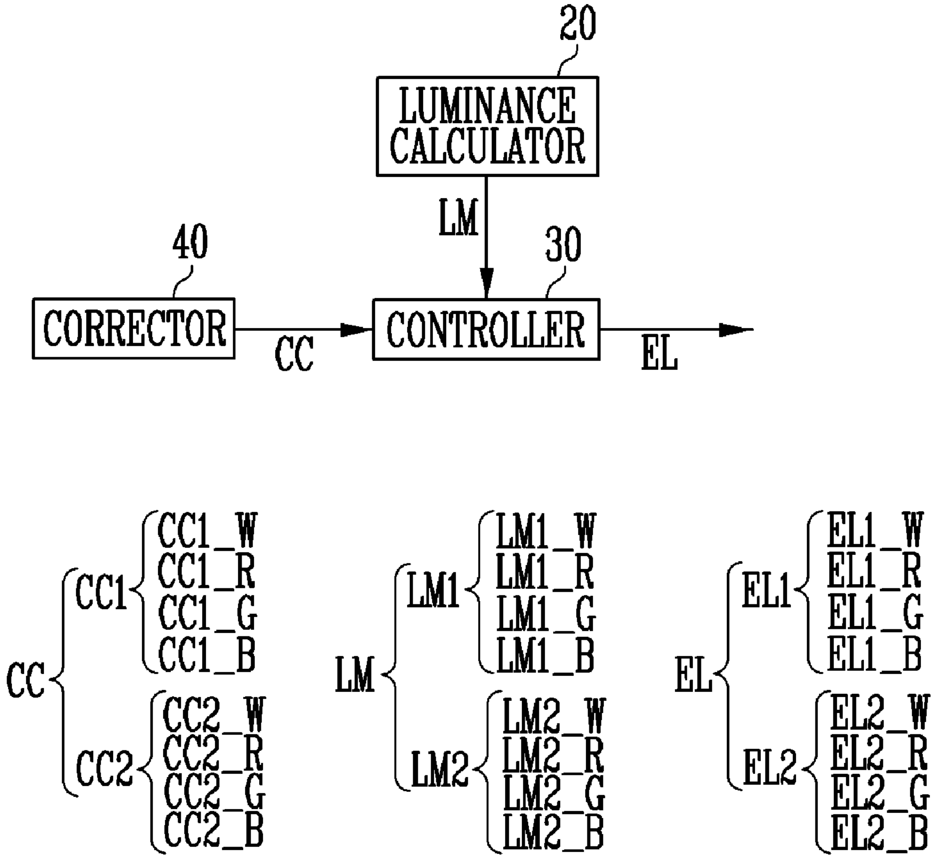
FIG. 8 is a diagram illustrating operations of a corrector and a controller in accordance with an embodiment of the present invention.

FIG. 8 is a diagram illustrating operations of the corrector and the controller in accordance with an embodiment of the present invention.

Referring to FIG. 8, the corrector 40 may calculate a correction current CC, based on a current calculated by the controller 30. That is, the corrector 40 may calculate a driving current flowing through the light emitting element by excluding the default current from a current supplied to the display panel 10.

The corrector 40 may calculate a first correction current CC1, based on a first current and a second current, which are calculated by the controller 30. For example, the corrector 40 may calculate the first correction current CC1, based on a difference between the first current and the second current. The corrector 40 may calculate a second correction current CC2, based on a third current and the second current, which are calculated by the controller 30. For example, the corrector 40 may calculate the second correction current CC2, based on a difference between the third current and the second current.

Referring to FIGS. 5A, 6, and 8, the corrector 40 may calculate a first correction current CC1_W, based on a difference between a first current C1_W and a second current C2_B, which are calculated by the controller 30. The first correction current CC1_W may include a driving current flowing through light emitting elements included in the first red sub-pixels SPXr1 of the first pixels PX1, a driving current flowing through light emitting elements included in the first green sub-pixels SPXg1 of the first pixels PX1, and a driving current flowing through light emitting elements included in the first blue sub-pixels SPXb1 of the first pixels PX1 in each of periods in which the first pixels PX1 of the first display area DA1 are driven with the white grayscale and the second pixels PX2 of the second display area DA2 are driven with the black grayscale.

Referring to FIGS. 5B, 6, and 8, the corrector 40 may calculate a first correction current CC1_R, based on a difference between a first current C1_R and the second current C2_B, which are calculated by the controller 30. The first correction current CC1_R may include the current flowing the light emitting elements included in the first red sub-pixels SPXr1 of the first pixels PX1 in each of periods in which the first pixels PX1 of the first display area DA1 are driven with a red grayscale and the second pixels PX2 of the second display area DA2 are driven with the black grayscale.

Referring to FIGS. 5C, 6, and 8, the corrector 40 may calculate a first correction current CC1_G, based on a difference between a first current C1_G and the second current C2_B, which are calculated by the controller 30. The first correction current CC1_G may include the current flowing the light emitting elements included in the first green sub-pixels SPXg1 of the first pixels PX1 in each of periods in which the first pixels PX1 of the first display area DA1 are driven with a green grayscale and the second pixels PX2 of the second display area DA2 are driven with the black grayscale.

Referring to FIGS. 5D, 6, and 8, the corrector 40 may calculate a first correction current CC1_B, based on a difference between a first current C1_B and the second current C2_B, which are calculated by the controller 30. The first correction current CC1_B may include the current flowing the light emitting elements included in the first blue sub-pixels SPXb1 of the first pixels PX1 in each of periods in which the first pixels PX1 of the first display area DA1 are driven with a blue grayscale and the second pixels PX2 of the second display area DA2 are driven with the black grayscale.

Referring to FIGS. 6, 7A, and 8, the corrector 40 may calculate a second correction current CC2_W, based on a difference between a third current C3_W and the second current C2_B, which are calculated by the controller 30. The second correction current CC2_W may include a driving current flowing through light emitting elements included in the second red sub-pixels SPXr2 of the second pixels PX2, a driving current flowing through light emitting elements included in the second green sub-pixels SPXg2 of the second pixels PX2, and a driving current flowing through light emitting elements included in the second blue sub-pixels SPXb2 of the second pixels PX2 in each of periods in which the first pixels PX1 of the first display area DA1 are driven with the black grayscale and the second pixels PX2 of the second display area DA2 are driven with the white grayscale.

Referring to FIGS. 6, 7B, and 8, the corrector 40 may calculate a second correction current CC2_R, based on a difference between a third current C3_R and the second current C2_B, which are calculated by the controller 30. The second correction current CC2_R may include the driving current flowing through the light emitting elements included in the second red sub-pixels SPXr2 of the second pixels PX2 in each of periods in which the first pixels PX1 of the first display area DA1 are driven with the black grayscale and the second pixels PX2 of the second display area DA2 are driven with a red grayscale.

Referring to FIGS. 6, 7C, and 8, the corrector 40 may calculate a second correction current CC2_G, based on a difference between a third current C3_G and the second current C2_B, which are calculated by the controller 30. The second correction current CC2_G may include the driving current flowing through the light emitting elements included in the second green sub-pixels SPXg2 of the second pixels PX2 in each of periods in which the first pixels PX1 of the first display area DA1 are driven with the black grayscale and the second pixels PX2 of the second display area DA2 are driven with a green grayscale.

Referring to FIGS. 6, 7D, and 8, the corrector 40 may calculate a second correction current CC2_B, based on a difference between a third current C3_B and the second current C2_B, which are calculated by the controller 30. The second correction current CC2_B may include the driving current flowing through the light emitting elements included in the second blue sub-pixels SPXb2 of the second pixels PX2 in each of periods in which the first pixels PX1 of the first display area DA1 are driven with the black grayscale and the second pixels PX2 of the second display area DA2 are driven with a blue grayscale.

Referring to FIG. 8, the controller 30 may calculate an efficiency lifetime EL, based on the correction current CC calculated by the corrector 40 and a luminance LM calculated by the luminance calculator 20. The controller 30 may evaluate a lifetime of the display panel 10, based on the calculated efficiency lifetime EL. For example, a time required until the calculated efficiency lifetime EL becomes 93% of an initial efficiency lifetime may be defined as the lifetime of the display panel 10, and the lifetime of the display panel may be evaluated based on the time. The initial efficiency lifetime may mean an efficiency lifetime of the display panel 10 before the light emitting element LD deteriorates.

The controller 30 may calculate a first efficiency lifetime EL1, based on the first correction current CC1 calculated by the corrector 40 and a first luminance LM1 calculated by the luminance calculator 20. For example, the controller 30 may calculate the first efficiency lifetime EL1, based on a ratio of the first luminance LM1 with respect to the first correction current CC1 (i.e., ratio of the first luminance LM1 to the first correction current CC1). The controller 30 may calculate a second efficiency lifetime EL2, based on the second correction current CC2 calculated by the corrector 40 and a second luminance LM2 calculated by the luminance calculator 20. For example, the controller 30 may calculate the second efficiency lifetime EL2, based on a ratio of the second luminance LM2 with respect to the second correction current CC2.

Referring to FIGS. 5A, 7A, and 8, the controller 30 may calculate a first efficiency lifetime EL1_W, based on a ratio of a first luminance LM1_W calculated by the luminance calculator 20 with respect to the first correction current CC1_W calculated by the corrector 40. The controller 30 may calculate a second efficiency lifetime EL2_W, based on a ratio of a second luminance LM2_W calculated by the luminance calculator 20 with respect to the second correction current CC2_W calculated by the corrector 40. The controller 30 may evaluate a white color lifetime of the display panel 10, based on the first efficiency lifetime EL1_W and the second efficiency lifetime EL2_W. For example, the controller 30 may evaluate, as the white color lifetime of the display panel 10, a time required until a difference between the first efficiency lifetime EL1_W and the second efficiency lifetime EL2_W becomes 93%.

Referring to FIGS. 2, 5B, 7B, and 8, the controller 30 may calculate a first efficiency lifetime EL1_R, based on a ratio of a first luminance LM1_R calculated by the luminance calculator 20 with respect to the first correction current CC1_R calculated by the corrector 40. The controller 30 may calculate a second efficiency lifetime EL2_R, based on a ratio of a second luminance LM2_R calculated by the luminance calculator 20 with respect to the second correction current CC2_R calculated by the corrector 40. The controller 30 may evaluate a red color lifetime of the display panel 10, based on the first efficiency lifetime EL1_R and the second efficiency lifetime EL2_R. For example, the controller 30 may evaluate, as the red color lifetime of the display panel 10, a time required until a difference between the first efficiency lifetime EL1_R and the second efficiency lifetime EL2_R becomes 93%. The red color lifetime of the display panel 10 may mean a lifetime of the first red sub-pixels SPXr1 of the first pixels PX1 and the second red sub-pixels SPXr2 of the second pixels PX2.

Referring to FIGS. 2, 5C, 7C, and 8, the controller 30 may calculate a first efficiency lifetime EL1_G, based on a ratio of a first luminance LM1_G calculated by the luminance calculator 20 with respect to the first correction current CC1_G calculated by the corrector 40. The controller 30 may calculate a second efficiency lifetime EL2_G, based on a ratio of a second luminance LM2_G calculated by the luminance calculator 20 with respect to the second correction current CC2_G calculated by the corrector 40. The controller 30 may evaluate a green color lifetime of the display panel 10, based on the first efficiency lifetime EL1_G and the second efficiency lifetime EL2_G. For example, the controller 30 may evaluate, as the green color lifetime of the display panel 10, a time required until a difference between the first efficiency lifetime EL1_G and the second efficiency lifetime EL2_G becomes 93%. The green color lifetime of the display panel 10 may mean a lifetime of the first green sub-pixels SPXg1 of the first pixels PX1 and the second green sub-pixels SPXg2 of the second pixels PX2.

Referring to FIGS. 2, 5D, 7D, and 8, the controller 30 may calculate a first efficiency lifetime EL1_B, based on a ratio of a first luminance LM1_B calculated by the luminance calculator 20 with respect to the first correction current CC1_B calculated by the corrector 40. The controller 30 may calculate a second efficiency lifetime EL2_B, based on a ratio of a second luminance LM2_B calculated by the luminance calculator 20 with respect to the second correction current CC2_B calculated by the corrector 40. The controller 30 may evaluate a blue color lifetime of the display panel 10, based on the first efficiency lifetime EL1_B and the second efficiency lifetime EL2_B. For example, the controller 30 may evaluate, as the blue color lifetime of the display panel 10, a time required until a difference between the first efficiency lifetime EL1_B and the second efficiency lifetime EL2_B becomes 93%. The blue color lifetime of the display panel 10 may mean a lifetime of the first blue sub-pixels SPXb1 of the first pixels PX1 and the second blue sub-pixels SPXb2 of the second pixels PX2.

Figure 9A:
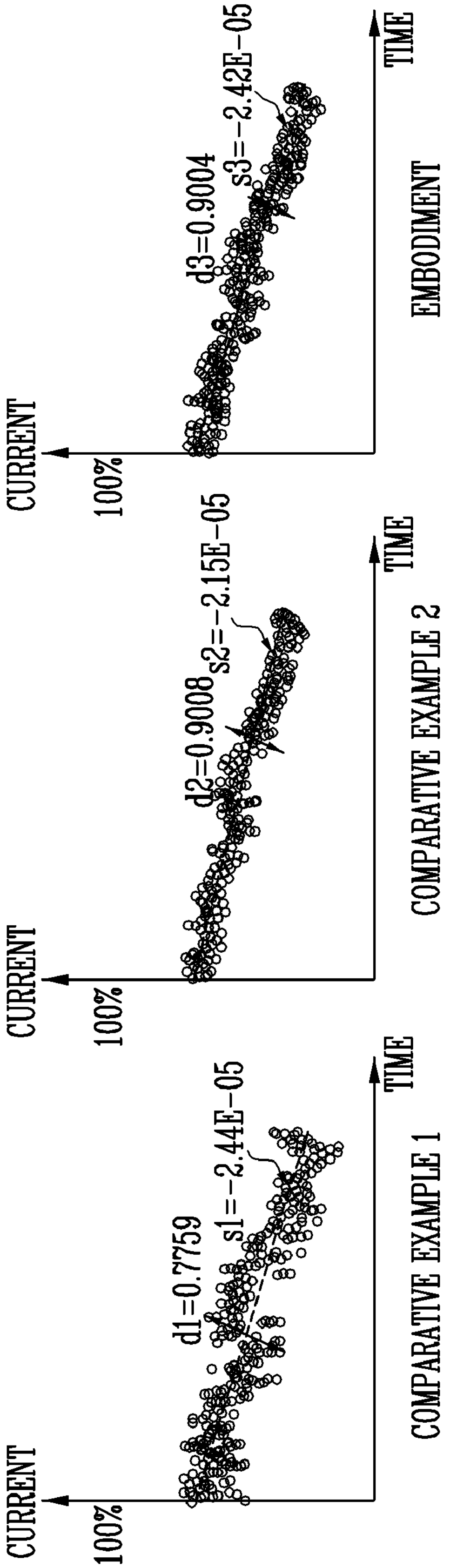
FIG. 9A is a diagram illustrating current changes according to time in accordance with comparative example 1, comparative example 2, and an embodiment of the present invention.

FIG. 9A is a diagram illustrating current changes according to time in accordance with comparative example 1, comparative example 2, and an embodiment of the present invention. In FIG. 9A, it may mean that a current noise becomes smaller as a distribution d becomes larger (or becomes closer to 1).

Referring to FIG. 9A, a distribution d1 of the comparative example 1 may be 0.7759, a distribution d2 of the comparative example 2 may be 0.9008, and a distribution d3 of the embodiment of the present invention may be 0.9004. From this, it can be seen that a current noise of the comparative example 1 is large and current noises of the comparative example 2 and the embodiment of the present invention are small.

Referring to FIG. 9A, a slope s1 of the comparative example 1 may be 2.44E-05, a slope s2 of the comparative example 2 may be 2.15E-05, and a slope s3 of the embodiment of the present invention may be 2.42E-05. Since a current flowing through the light emitting element is measured in the comparative example 1, it may mean that the accuracy of lifetime evaluation of the display panel becomes higher as becoming closer to the slope s1 of the comparative example 1. Accordingly, since the slope s3 of the embodiment of the present invention is similar to the slope s1 of the comparative example 1, the accuracy of lifetime evaluation of the display panel is high, but the slope s2 of the comparative example 2 is different from the slope s1 of the comparative example 1. Therefore, the accuracy of lifetime evaluation of the display panel is degraded.

Figure 9B:
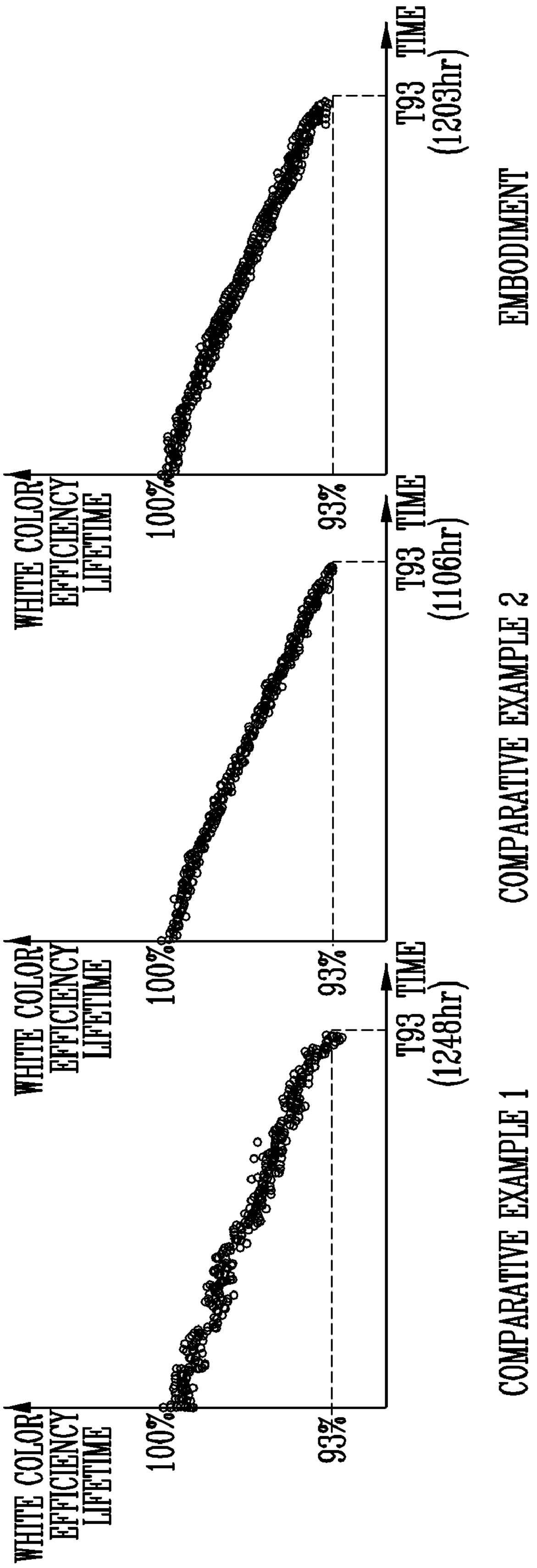
FIG. 9B is a diagram illustrating white color efficiency lifetimes of a display panel in accordance with comparative example 1, comparative example 2, and an embodiment of the present invention.

FIG. 9B is a diagram illustrating white color efficiency lifetimes of a display panel in accordance with comparative example 1, comparative example 2, and an embodiment of the present invention. In FIG. 9B, T93 may mean a time at which a white color efficiency lifetime of the display panel becomes 93% of an initial white color efficiency lifetime (i.e. 100%). That is, T93 may mean a white color efficiency lifetime of the display panel.

Referring to FIG. 9B, the white color efficiency lifetime of the display panel in accordance with the comparative example 1 may be 1248 hours, the white color efficiency lifetime of the display panel in accordance with the comparative example 2 may be 1106 hours, and the white color efficiency lifetime of the display panel in accordance with the embodiment of the present invention may be 1203 hours. Since the white color efficiency lifetime of the display panel is evaluated based a current flowing through the light emitting element in the comparative example 1, it may mean that the accuracy of lifetime evaluation of the display panel becomes higher as becoming closer to the white color efficiency lifetime of the display panel in accordance with the comparative example 1. Accordingly, since the white color efficiency lifetime in accordance with the embodiment of the present invention is similar to the white color efficiency lifetime of the display panel in accordance with the comparative example 1, but the white color efficiency lifetime of the display panel in accordance with the comparative example 2 is different from the white color efficiency lifetime in accordance with the embodiment of the present invention. Therefore, the accuracy of lifetime evaluation of the display panel is degraded.

That is, in the embodiment of the present invention, the default current is excluded from the current supplied to the display panel through the corrector, so that the lifetime of the display panel is evaluated based on the driving current flowing through the light emitting element. Hence, the accuracy of lifetime evaluation of the display panel is high, and the current noise is small.

In accordance with the present invention, the default current is excluded from the current supplied to the display panel, so that the lifetime of the display panel can be efficiently and accurately evaluated based on the driving current flowing through the light emitting element without any current measuring device.

Also, in accordance with the present invention, the lifetime of the display panel can be evaluated based on a correction current obtained by excluding the default current from the current supplied to the display panel. Thus, the current noise is small.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for evaluating a lifetime of a display panel including first pixels disposed in a first display area and second pixels disposed in a second display area, the apparatus comprising:

a controller configured to drive the first pixels with a first grayscale and the second pixels with a second grayscale during an aging period, calculate a first current supplied to the display panel in each of periods in which the first pixels are driven with a third grayscale and the second pixels are driven with the second grayscale, calculate a second current supplied to the display panel in each of periods in which the first pixels and the second pixels are driven with the second grayscale, and calculate a third current supplied to the display panel in each of periods in which the first pixels are driven with the second grayscale and the second pixels are driven with a fourth grayscale;

a luminance calculator configured to calculate a first luminance of the first display area in each of the periods in which the first pixels are driven with the third grayscale and the second pixels are driven with the second grayscale, and calculate a second luminance of the second display area in each of the periods in which the first pixels are driven with the second grayscale and the second pixels are driven with the fourth grayscale; and a corrector configured to calculate a first correction current based on the calculated first current and the calculated second current, and calculate a second correction current based on the calculated third current and the calculated second current, wherein the controller calculates a first efficiency lifetime based on the calculated first correction current and the calculated first luminance, calculates a second efficiency lifetime based on the calculated second correction current and the calculated second luminance, and evaluates the lifetime of the display panel based on the first efficiency lifetime and the second efficiency lifetime.

2. The apparatus of claim 1, wherein the first display area and the second display area are bilaterally symmetrical to each other.

3. The apparatus of claim 1, wherein the first grayscale is a white grayscale, the second grayscale is a black grayscale, the third grayscale is the white grayscale, a red grayscale, a green grayscale, or a blue grayscale, and the fourth grayscale is the white grayscale, the red grayscale, the green grayscale, or the blue grayscale.

4. The apparatus of claim 1, wherein the corrector calculates the first correction current based on a difference between the calculated first current and the calculated second current, and calculates the second correction current based on a difference between the calculated third current and the calculated second current.

5. The apparatus of claim 1, wherein the controller calculates the first efficiency lifetime based on a ratio of the calculated first luminance with respect to the calculated first correction current, and calculates the second efficiency lifetime based on a ratio of the calculated second luminance with respect to the calculated second correction current.

6. The apparatus of claim 3, wherein each of the first pixels includes a first red sub-pixel, a first green sub-pixel, and a first blue sub-pixel, and each of the second pixels includes a second red sub-pixel, a second green sub-pixel, and a second blue sub-pixel.

7. The apparatus of claim 3, wherein, based on the first efficiency lifetime when the third grayscale is the white grayscale and the second efficiency lifetime when the fourth grayscale is the white grayscale, the controller evaluates a white color lifetime of the display panel.

8. The apparatus of claim 6, wherein, based on the first efficiency lifetime when the third grayscale is the red grayscale and the second efficiency lifetime when the fourth grayscale is the red grayscale, the controller evaluates a lifetime of the first red sub-pixels and the second red sub-pixels.

9. The apparatus of claim 6, wherein, based on the first efficiency lifetime when the third grayscale is the green grayscale and the second efficiency lifetime when the fourth grayscale is the green grayscale, the controller evaluates a lifetime of the first green sub-pixels and the second green sub-pixels.

10. The apparatus of claim 6, wherein, based on the first efficiency lifetime when the third grayscale is the blue grayscale and the second efficiency lifetime when the fourth grayscale is the blue grayscale, the controller evaluates a lifetime of the first blue sub-pixels and the second blue sub-pixels.

11. A method for evaluating a lifetime of a display panel including first pixels disposed in a first display area and second pixels disposed in a second display area, the method comprising:

driving the first pixels with a first grayscale and driving the second pixels with a second grayscale during an aging period;

calculating a first current supplied to the display panel and a first luminance of the first display area in each of periods in which the first pixels are driven with a third grayscale and the second pixels are driven with the second grayscale;

calculating a second current supplied to the display panel in each of periods in which the first pixels and the second pixels are driven with the second grayscale;

calculating a third current supplied to the display panel and a second luminance of the second display area in each of periods in which the first pixels are driven with the second grayscale and the second pixels are driven with a fourth grayscale;

calculating a first correction current based on the calculated first current and the calculated second current, and calculating a second correction current based on the calculated third current and the calculated second current; and calculating a first efficiency lifetime based on the calculated first correction current and the calculated first luminance, and calculating a second efficiency lifetime based on the calculated second correction current and the calculated second luminance.

12. The method of claim 11, wherein the first display area and the second display area are bilaterally symmetrical to each other.

13. The method of claim 11, wherein the first grayscale is a white grayscale, the second grayscale is a black grayscale, the third grayscale is the white grayscale, a red grayscale, a green grayscale, or a blue grayscale, and the fourth grayscale is the white grayscale, the red grayscale, the green grayscale, or the blue grayscale.

14. The method of claim 11, wherein the first correction current is calculated based on a difference between the calculated first current and the calculated second current, and the second correction current is calculated based on a difference between the calculated third current and the calculated second current.

15. The method of claim 11, wherein the first efficiency lifetime is calculated based on a ratio of the calculated first luminance with respect to the calculated first correction current, and the second efficiency lifetime is calculated based on a ratio of the calculated second luminance with respect to the calculated second correction current.

16. The method of claim 13, wherein each of the first pixels includes a first red sub-pixel, a first green sub-pixel, and a first blue sub-pixel, and each of the second pixels includes a second red sub-pixel, a second green sub-pixel, and a second blue sub-pixel.

17. The method of claim 13, further comprising evaluating a white color lifetime of the display panel based on the first efficiency lifetime when the third grayscale is the white grayscale and the second efficiency lifetime when the fourth grayscale is the white grayscale.

18. The method of claim 16, further comprising evaluating a lifetime of the first red sub-pixels and the second red sub-pixels based on the first efficiency lifetime when the third grayscale is the red grayscale and the second efficiency lifetime when the fourth grayscale is the red grayscale.

19. The method of claim 16, further comprising evaluating a lifetime of the first green sub-pixels and the second green sub-pixels based on the first efficiency lifetime when the third grayscale is the green grayscale and the second efficiency lifetime when the fourth grayscale is the green grayscale.

20. The method of claim 16, further comprising evaluating a lifetime of the first blue sub-pixels and the second blue sub-pixels based on the first efficiency lifetime when the third grayscale is the blue grayscale and the second efficiency lifetime when the fourth grayscale is the blue grayscale.

* * * * *